(12) United States Patent
Park et al.

(10) Patent No.: US 7,232,095 B2
(45) Date of Patent: Jun. 19, 2007

(54) OVERHEAD REST ASSEMBLY

(75) Inventors: James R Park, Everett, WA (US);
Karen L Hills, Everett, WA (US);
Jeffrey D Farnsworth, Marysville, WA (US); William E McCammon, Bothell, WA (US); Jerry A Grayson, Everett, WA (US); Susan L Robinson, Everett, WA (US); Kevin M Barrick, Kingston, WA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 10/935,998

(22) Filed: Sep. 8, 2004

(65) Prior Publication Data
US 2006/0049310 A1 Mar. 9, 2006

(51) Int. Cl.
*B64D 11/06* (2006.01)

(52) U.S. Cl. .................... 244/118.6; 244/118.5

(58) Field of Classification Search ............ 244/118.5, 244/118.6, 118.1, 117 R, 137.4, 137.1; 248/339, 248/340, 341
See application file for complete search history.

(56) References Cited

U.S. PATENT DOCUMENTS

| | | | |
|---|---|---|---|
| 2,081,529 A | 5/1937 | Canney | |
| 2,092,655 A | 9/1937 | Page, Jr. | |
| 3,784,989 A | 1/1974 | LeGrand | |
| 5,115,999 A | 5/1992 | Buchsel et al. | |
| 5,784,836 A | 7/1998 | Ehrick | |
| 6,237,872 B1 | 5/2001 | Bar-Levav | |
| 6,464,169 B1 | 10/2002 | Johnson et al. | |
| 6,616,098 B2 * | 9/2003 | Mills | 244/118.5 |
| 6,848,654 B1 * | 2/2005 | Mills et al. | 244/118.5 |
| 6,874,731 B1 * | 4/2005 | Brauer et al. | 244/118.5 |

* cited by examiner

*Primary Examiner*—Timothy D. Collins
(74) *Attorney, Agent, or Firm*—Harness, Dickey & Pierce, P.L.C.

(57) ABSTRACT

A crew rest berth support system includes a crew berth assembly having first and second berths. Hook assemblies suspend the first berth from mobile platform structure. Pin assemblies suspend the second berth from the structure. Cam assemblies connect the first and second berths. The hook assemblies permit first berth rotation in a first path and the pin assemblies permit second berth rotation in a second path substantially perpendicular to the first path. When the first and second berths are connected using the cam assemblies the crew berth assembly is restrained from motion in either the first or the second paths. An entrance cap rotatably mounted to the platform structure prior to the first and second berths is also provided.

24 Claims, 23 Drawing Sheets

OVERHEAD REST ASSEMBLY

FIELD OF THE INVENTION

The present invention relates in general to crew rest berths and more specifically to an aircraft overhead crew rest berth apparatus and method of installation.

BACKGROUND OF THE INVENTION

Mobile vehicles including aircraft, trains, ships, etc. often provide rest areas for crew or passengers when the vehicle is intended for operation over lengthy time periods. Commercial aircraft in particular are required to provide crew rest spaces for aircraft which operate over extended periods of time. Common crew rest areas include bunks or berths, seats, and lavatories for crew use. Aircraft crew rests are often separately provided for flight crew members and for flight attendants. Requirements for both crew rests vary. Some aircraft locate flight attendant rest areas at the aft end of the aircraft, rearward of the aft passenger seating area and above the ceiling of the aft passenger seating area. In these areas, crew rest berths are supported from aircraft frames or frame connecting structure. Some aircraft position crew rest areas adjacent to or in a lower level baggage stowage area. Crew rest berths in these areas are supported by the baggage support structure or platforms. Crew rest areas for flight crew personnel have been positioned forward of the flight attendant crew rest areas in the aircraft, and can also be supported from aircraft frames or overhead structure or positioned in lower levels of the aircraft. Each of these rest area locations are accessible using staircases and doorways or hatches, but the space is often co-occupied by additional items.

Crew rest berths are enclosures generally provided for an individual to rest or sleep in private, often having curtains or doors, electrical supply outlets, etc. It is often difficult to install crew rest berths on mobile platforms such as aircraft due to the weight of the berths, which can approach 300 pounds, which necessitates use of special lifting/handling equipment. Access for installation of crew rest berths is also limited by items such as piping, structure, environmental control system ducting, flight control cabling, fire detection systems, stow-bin support structure and center stow-bins, and electrical cabling positioned adjacent to or passing through the crew rest areas. Aircraft also commonly position passageways on the longitudinal centerline of the aircraft to maximize the usable space. Installation of all these items needs to be coordinated during construction of the aircraft.

Assembly sequencing of the above items are predetermined and therefore installation of crew rest berthing effects the overall construction schedule of the platform or aircraft. The additional structure commonly required to support each berth also adds weight, complexity, and cost. Installing multiple crew rest berths as a single unit is often impractical for many passenger platform designs because the installation sequence can require crew berth installation via fixed geometry doorways and partially assembled walkways. Access space for the installing mechanics and any equipment is also required. A crew rest berth design which offers faster and simpler installation is therefore desirable.

SUMMARY OF THE INVENTION

According to a preferred embodiment, an overhead rest assembly of the present invention includes a crew berth assembly having first and second berths. Hook assemblies suspend the first berth from structure of the mobile platform. Pin assemblies suspend the second berth from structure of the mobile platform. Cam assemblies connect the first berth to the second berth. The hook assemblies permit first berth rotation in a first path and the pin assemblies permit second berth rotation in a second path substantially perpendicular to the first path. When the first berth is connected to the second berth using the cam assemblies the crew berth assembly is restrained from motion in either the first or the second paths.

In another preferred embodiment, loads of each of the berths are reduced through the use of lightweight carbon fiber material for the berths. By joining berths which separately can rotate in different paths or directions, the berth assembly thus formed prevents berth rotation and one or more shared load paths are formed through the assembly. Load paths for each berth are shared with the adjoining berth. In still another preferred embodiment of the present invention, an entrance cap is mechanically connected to a berth assembly of the present invention. Load paths for each berth or both berths are thereby shared with the entrance cap.

According to yet still another preferred embodiment of the present invention, a method for supporting a crew berth assembly to a mobile platform includes: rotating the first berth in a first direction to align the hook member attached to the first berth with the hook engagement member; engaging the hook member with the hook engagement member; aligning the pin connected to the second berth with the pin receiving member; and sliding the pin into the pin receiving member in a second direction substantially perpendicular to the first direction to support the second berth from the structure.

An overhead rest assembly of the present invention offers several advantages. By connecting a first berth to structure of a mobile platform using a hook assembly, the first berth is allowed to rotate in a first direction. By connecting a second berth to the structure of the mobile platform using a pin assembly, the second berth is allowed to rotate in a second direction which is substantially perpendicular to the first direction. Allowing limited rotation of each berth during installation permits the berths to be landed without interfering with each other while permitting the first berth to be used as an additional alignment device to help align the second berth when it is landed. A combination of cam assemblies, hook assemblies, and pin assemblies of the present invention prevents subsequent motion of the berths and allows loads from either one of the berths to be partially transferred through the other berth.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
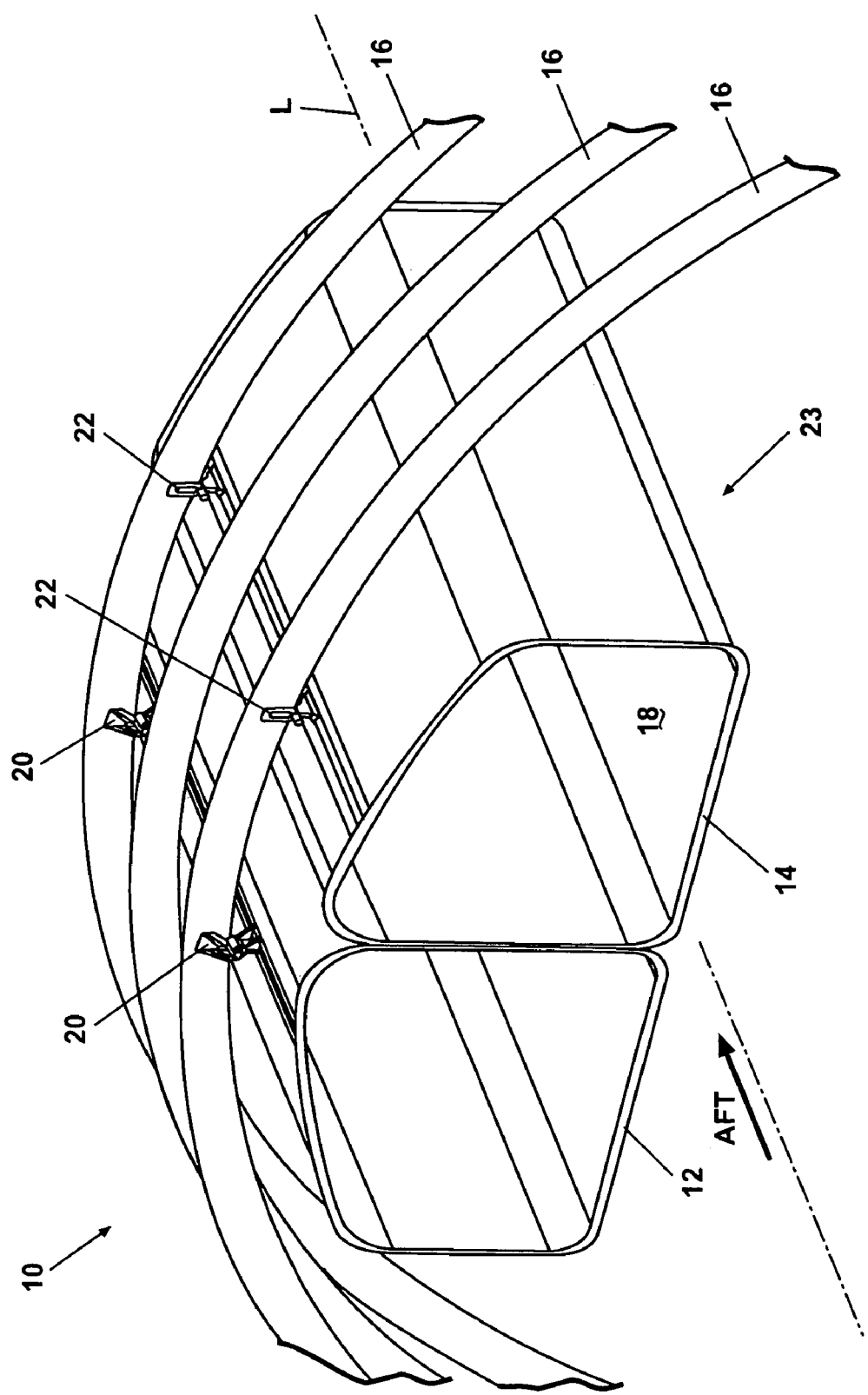
FIG. 1 is a perspective view of a two-piece overhead rest assembly according to a preferred embodiment of the present invention.

According to a preferred embodiment of the present invention and referring generally to FIG. 1, a berth support system 10 includes a first berth 12 and a second berth 14. The invention can be used for example within ships, buses, trains, etc., in addition to aircraft. For purposes of simplification, the invention will be described hereinafter in reference to an aircraft application. Each of the first and second berths 12, 14 are supported by support structural members 16 of a mobile platform. In the embodiment shown, support structural members 16 are individual frames of the aircraft. Support structural member 16 can also include intercostal members as well as other structure.

Each first and second berth 12, 14 includes a personnel access cavity 18 which permits entry and exit of personnel for first and second berths 12, 14. First and second berths 12, 14 are preferably constructed from a polycarbonate/fiber material such that any desired shape for first or second berths 12, 14 can be provided. By use of a lightweight yet strong material such as polycarbonate/fiber, first and second berths 12, 14 are both lightweight (approximately 50 pounds each) and sufficiently rigid such that support of each of the berths to support structural member 16 does not allow deformation of either first or second berths 12, 14.

First berth 12 is provided with a plurality of hook assemblies 20, which support first berth 12 to at least one of the support structural members 16 and preferably two or more support structural members 16. First berth 12 is supported from support structural members 16 such that a longitudinal axis of first berth 12 is substantially parallel to a longitudinal axis "L" of the aircraft.

Second berth 14 is supported adjacent first berth 12 using a plurality of pin assemblies 22 which support second berth 14 to at least one of the support structural members 16 and preferably two or more support structural members 16. Similar to first berth 12, second berth 14 is supported from support structural members 16 such that a longitudinal axis of second berth 14 is substantially parallel to longitudinal axis "L". A combination of first berth 12 and second berth 14 together form a berth assembly 23.

In a preferred embodiment berth assembly 23 is configured such that each of first berth 12 and second berth 14 are aligned in a generally fore/aft configuration. The invention is not limited to a particular orientation of berth assembly 23. For example, first and second berths 12, 14 can be arranged substantially parallel to support structural members 16 depending upon the overall space limitations of the aircraft.

Figure 2:
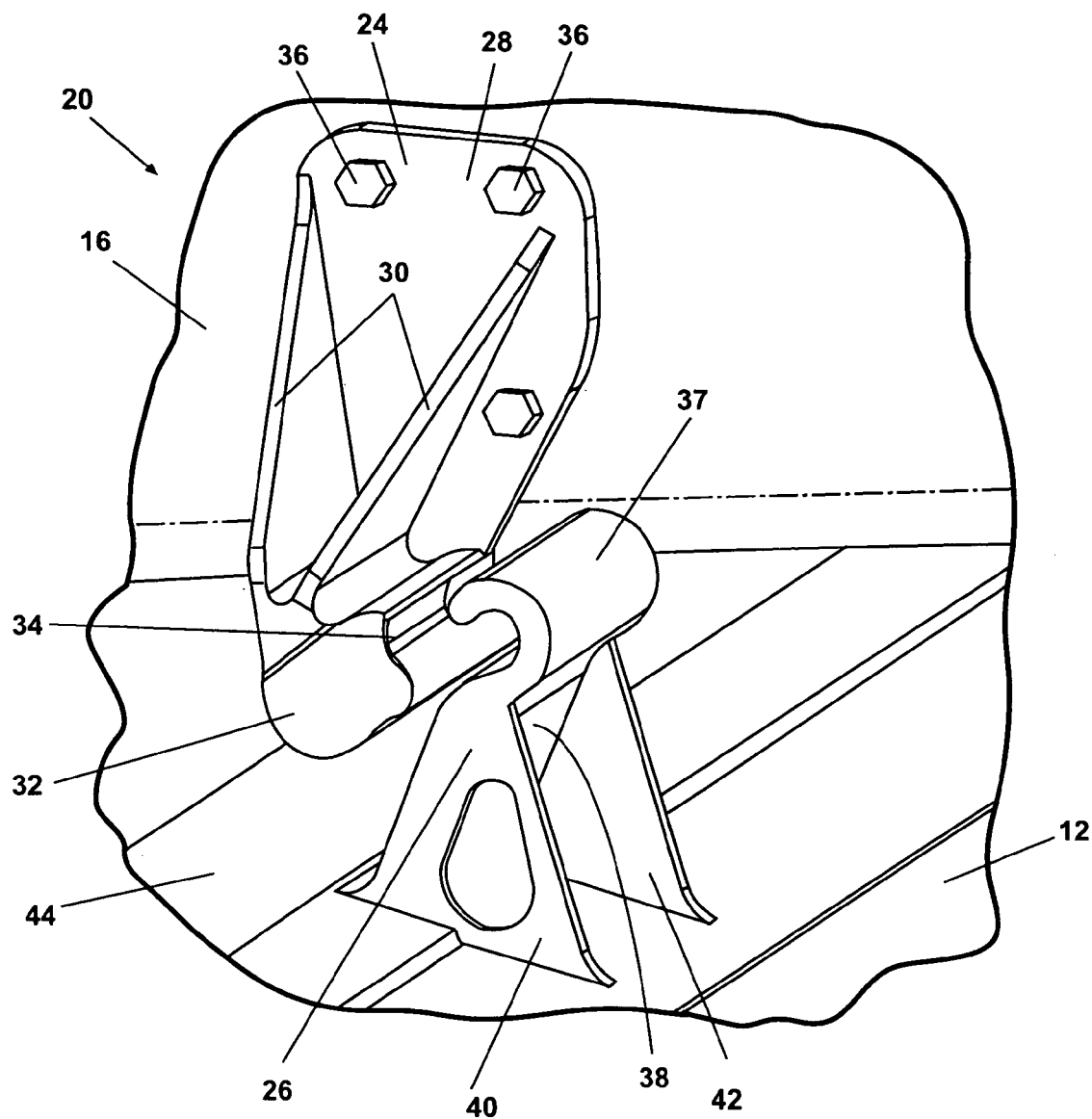
FIG. 2 is a perspective view showing the component parts of a hook assembly used to join a first crew berth to aircraft structure.

As best seen in FIG. 2, hook assembly 20 includes a base member 24 which is fastenably connected to one of the support structural members 16, and a hook member 26 which is connected to first berth 12. Base member 24 further includes a base plate 28, a plurality of reinforcement ribs 30, a hook receiving portion 32 and a hook receiving slot 34. Base member 24 is preferably fastenably connected to one of support structural members 16 using a plurality of fasteners 36. Fasteners 36 are shown as hexagonal bolts, however, fasteners 36 can be any type of commonly available fastener suitable for the application. Examples of suitable fasteners 36 include rivets, self-threading fasteners, through bolts, etc. Base member 24 is preferably provided from a polycarbonate composite material. Base member 24 can also be provided from alternate materials such as metals which include aluminum, steel, bronze, etc. If base member 24 and support structural member 16 are provided of weldable material(s), fasteners 36 can be eliminated and base plates 28 can be welded or brazed to support structural members 16.

Hook member 26 includes a hook 37 integrally connected to a hook base 38 and each of a first reinforcement flange 40 and a second reinforcement flange 42. In a preferred embodiment of the present invention, hook member 26 is joined to first berth 12 via a load distribution member 44. Load distribution member 44 can be a material comparable to the material used for first berth 12 or can also be an alternate material. Load distribution member 44 permits the weight and/or motion load carried by hook member 26 to be more evenly distributed through first berth 12. In one aspect of the invention, hook member 26 is made from a metal capable of being welded, allowing hook member 26 to be welded to a metal load distribution member 44, which is then subsequently bonded to first berth 12. Load distribution member 44 can also be expanded such that each of a plurality of hook members 26 can be connected to a single load distribution member 44. FIG. 2 shows base member 24 spaced from hook member 26, prior to engagement of hook 37 within hook receiving slot 34.

Figure 3:
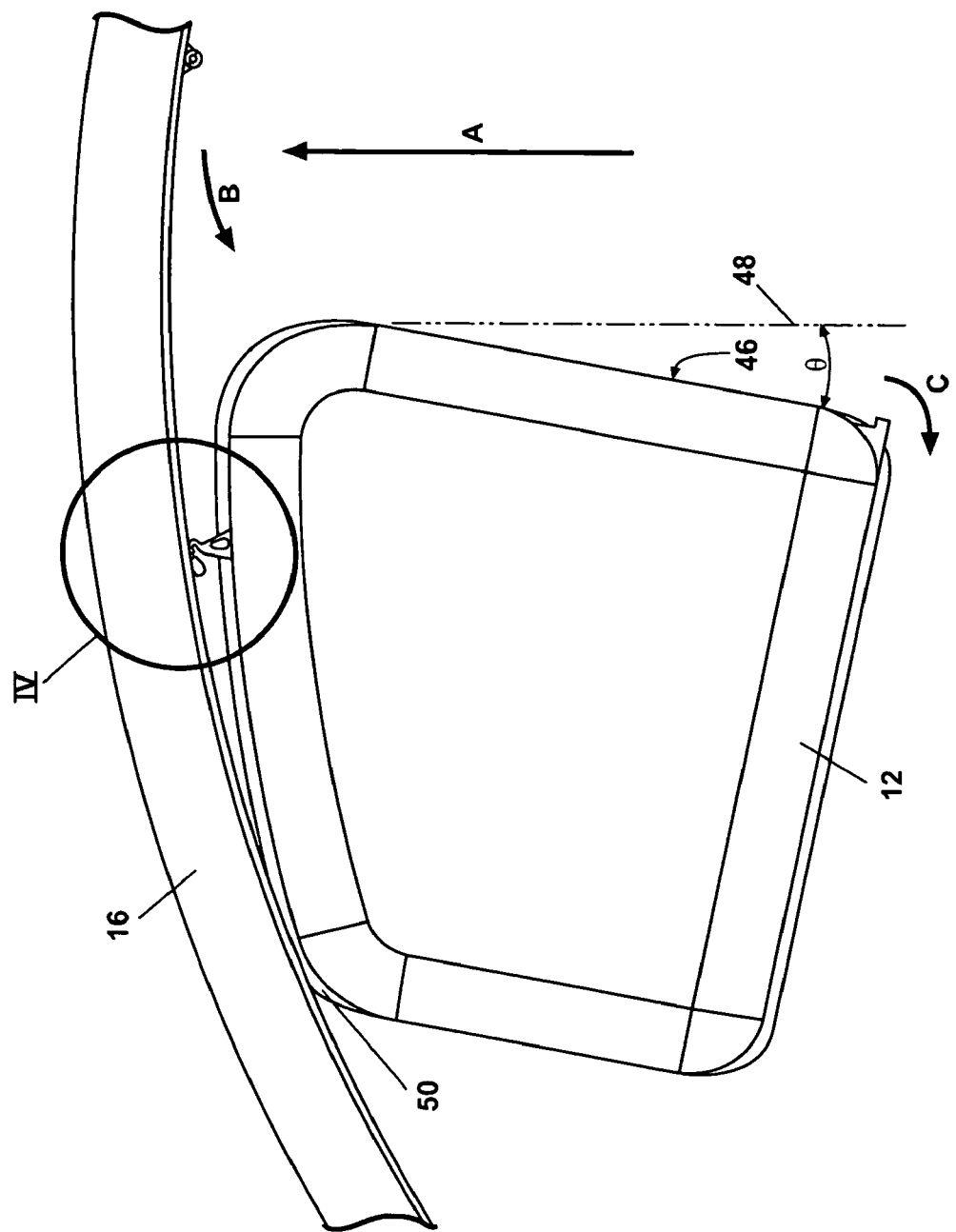
FIG. 3 is an elevational view looking aft showing an initial position during installation of the first crew berth.

As best seen in FIG. 3, to install first berth 12 in the aircraft, first berth 12 is lifted in a lift direction "A" until it is in the approximate position shown in FIG. 3. First berth 12 is then translated in a hook engagement direction "B" until hook 37 engages within hook receiving slot 34. In order to initially engage hook 37, first berth 12 is rotated about a rotation angle θ along an installation rotation arc "C" such that a mating surface 46 of first berth 12 is displaced by rotation angle θ from a vertical plane 48. A maximum rotation for first berth 12 is limited by contact between a portion 50 of first berth 12 and support structural member 16. In a preferred embodiment of the present invention rotation angle θ is approximately 12°. Once rotation angle θ is reached, first berth 12 is translated in the hook engagement direction "B" until hook 37 engages within hook receiving slot 34. Where two or more hook assemblies 20 are used, each hook assembly 20 is visually aligned such that hooks 37 engage within hook receiving slots 34 for each hook assembly 20. In one preferred embodiment of the present invention, two hook assemblies 20 are used to support first berth 12.

Figure 4:
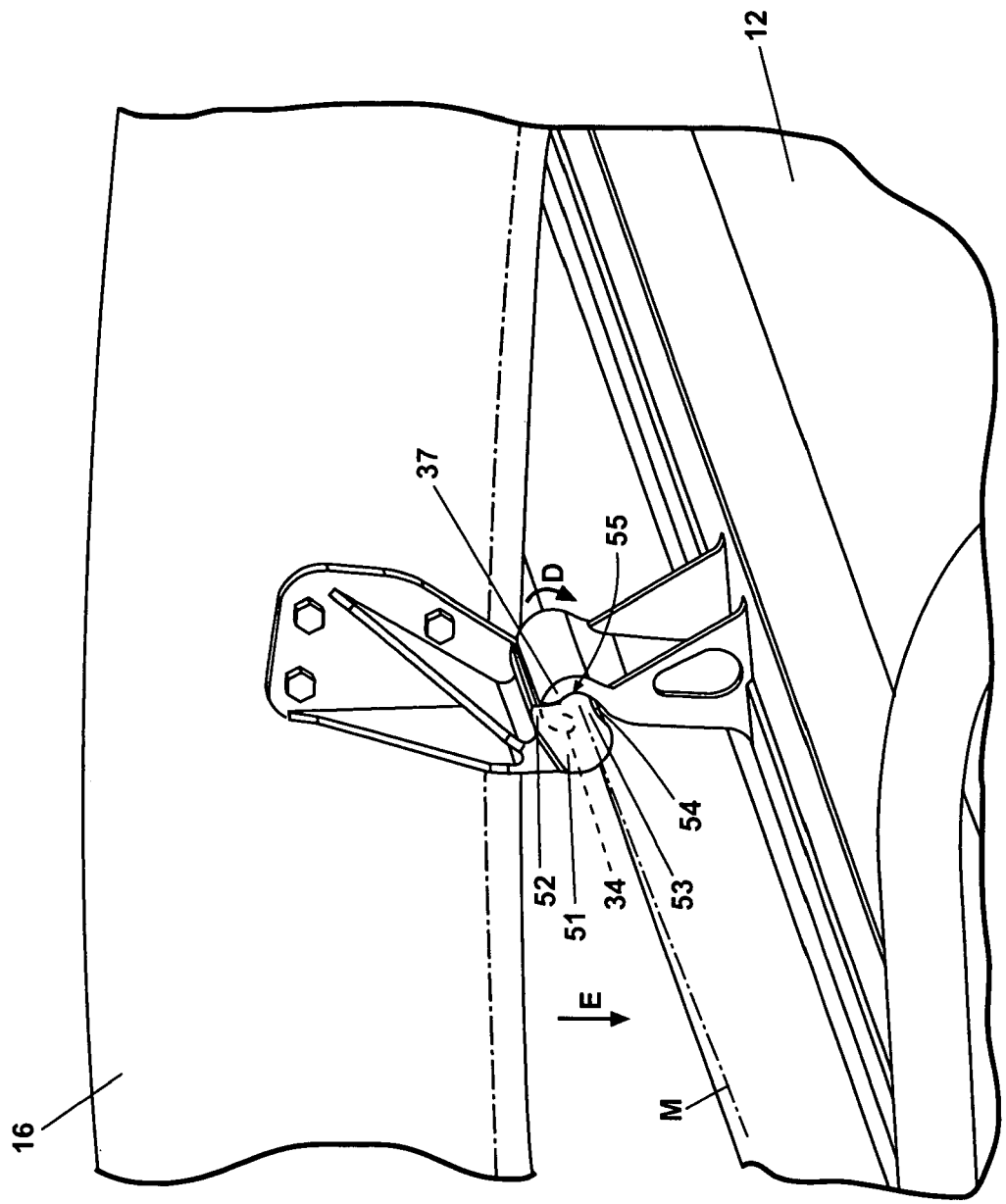
FIG. 4 is a perspective view similar to FIG. 2 showing the first berth hook assembly in an installed load bearing position.

Referring generally to FIG. 4, after hooks 37 engage within respective hook receiving slots 34, first berth 12 is allowed to self rotate until the position shown in FIG. 4 is reached wherein hooks 37 are fully engaged within hook receiving slots 34. Each hook assembly 20 thereby reaches a first berth load bearing position shown. Each hook receiving slot 34 is shaped to closely align with hook 37 such that hook 37 must be rotated from the position shown in order to thereafter remove hook 37 from hook receiving slot 34. This rotation must be performed about an installation/removal rotation arc "D". In the load bearing position shown, hook 37 is prevented from releasing in a forward or aft direction (as seen in FIG. 4 toward or away from the viewer) by a pair of opposed hook retention walls 51 (only the forward one is visible in FIG. 4) integrally provided with hook receiving portion 32. In the same load bearing position, hook 37 is prevented from releasing in a vertically upward direction (as viewed in FIG. 4) by a hook retention member 52 integrally provided with hook receiving portion 32. A weight as a static load or a dynamic load of first berth 12 (collectively referred to hereinafter as the load) is transferred to a load bearing member 53. Load bearing member 53 also provides a rotational surface about which hook 37 can rotate. A clearance cavity 54 is provided adjacent load bearing member 53 to allow hook 37 to fully rotate about rotation angle θ (shown in FIG. 3). A hook cavity 55 defined on an inner surface of hook 37 allows hook 37 to rotate about load bearing member 53. The weight (in a load direction "E") and the total load of first berth 12 is transferred by hook 37 through base member 24. Hook 37 rotates about load bearing member 53 on a longitudinal axis "M" of load bearing member 53. In a preferred embodiment of the present invention longitudinal axis "M" is substantially parallel to longitudinal axis "L" of the aircraft.

Figure 5:
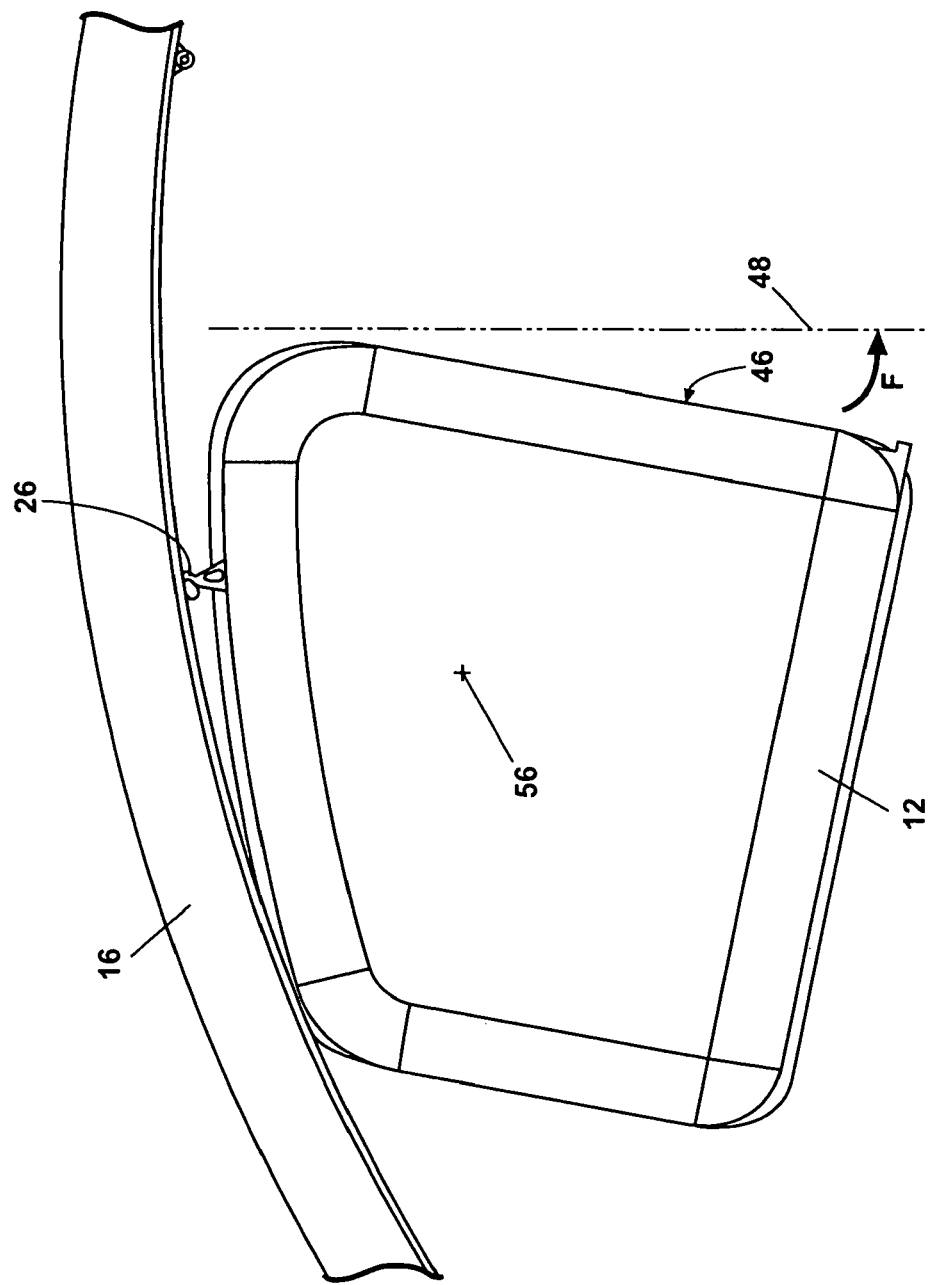
FIG. 5 is an elevational view similar to FIG. 3 showing a connected position of the hook assembly for the first berth.

Referring generally to FIG. 5, once hook 37 is engaged within hook receiving slot 34, first berth 12 self-rotates about longitudinal axis "M" until mating surface 46 is approximately parallel to a vertical plane 48. The path of rotation is about an arc "F". By locating hook member 26 as shown displaced from a berth center-of-gravity 56, self-rotation of first berth 12 from the position shown in FIG. 3 will occur until mating surface 46 is approximately parallel to vertical plane 48. Placement of hook member 26 on first berth 12 is predetermined such that when first berth 12 self-rotates about berth center-of-gravity 56, mating surface 46 will be approximately parallel to vertical plane 48. This prepositions first berth 12 in a position to help alignment of second berth 14, as follows.

Figure 6:
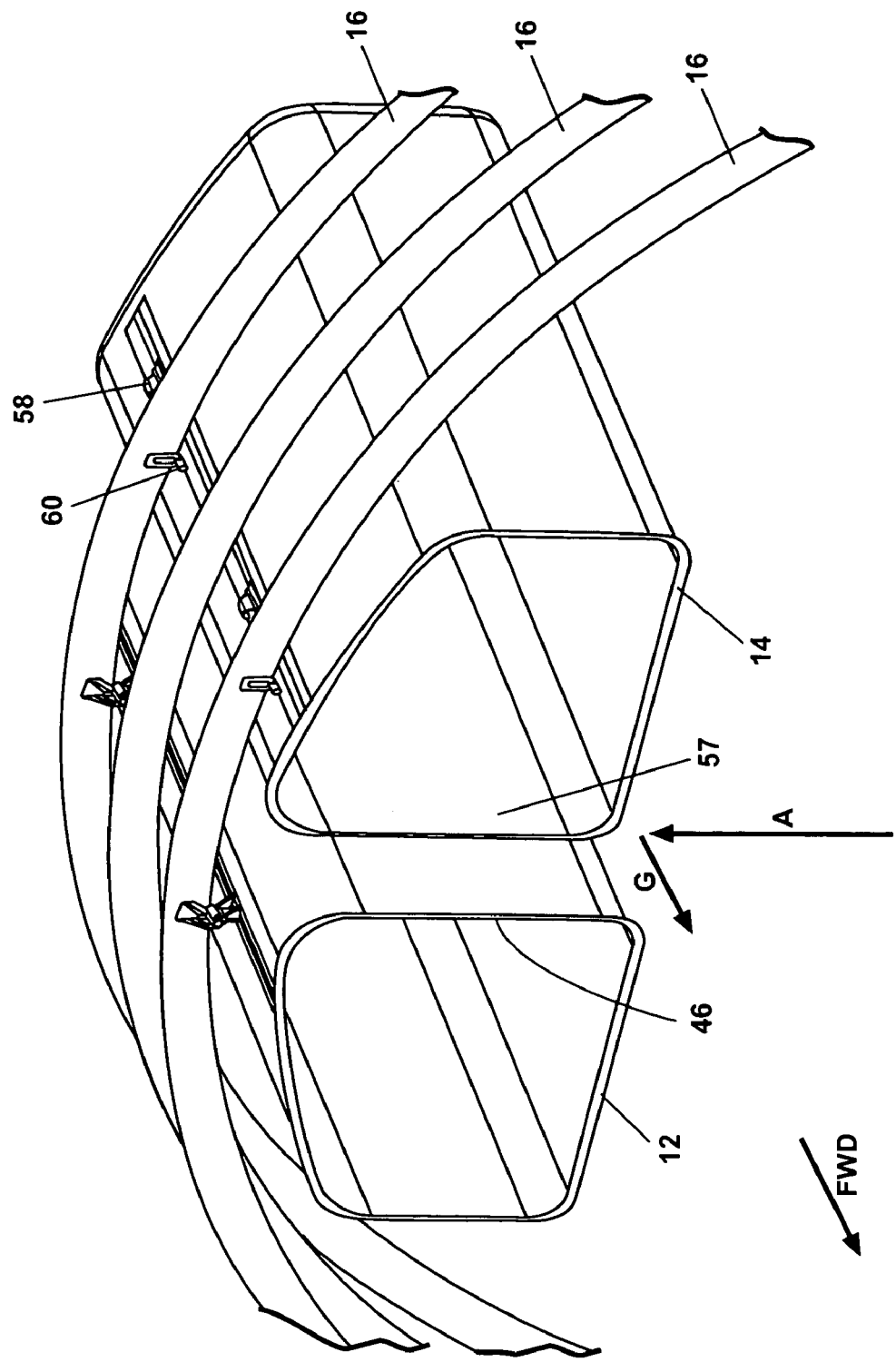
FIG. 6 is a perspective view of an intermediate assembly position having the first berth supported from the aircraft structure and the second berth positioned prior to connection to the aircraft.

As best seen in FIG. 6, first berth 12 was previously mounted to support structural member 16 and released such that mating surface 46 is approximately parallel to vertical plane 48. At this time, second berth 14 is lifted in lift direction "A" until the approximate position shown in FIG. 6 is reached. In this position, one or more pins 58 connected to second berth 14 are each visually aligned with individual ones of a plurality of pin receiving members 60 connected to support structural member 16. Second berth 14 is thereafter translated in an installation direction "G" until each pin 58 is slidably received within a respective one of pin receiving members 60. A mating surface 57 of second berth 14 is also aligned with mating surface 46 of first berth 12 to assist in the installation of second berth 14.

Figure 7:
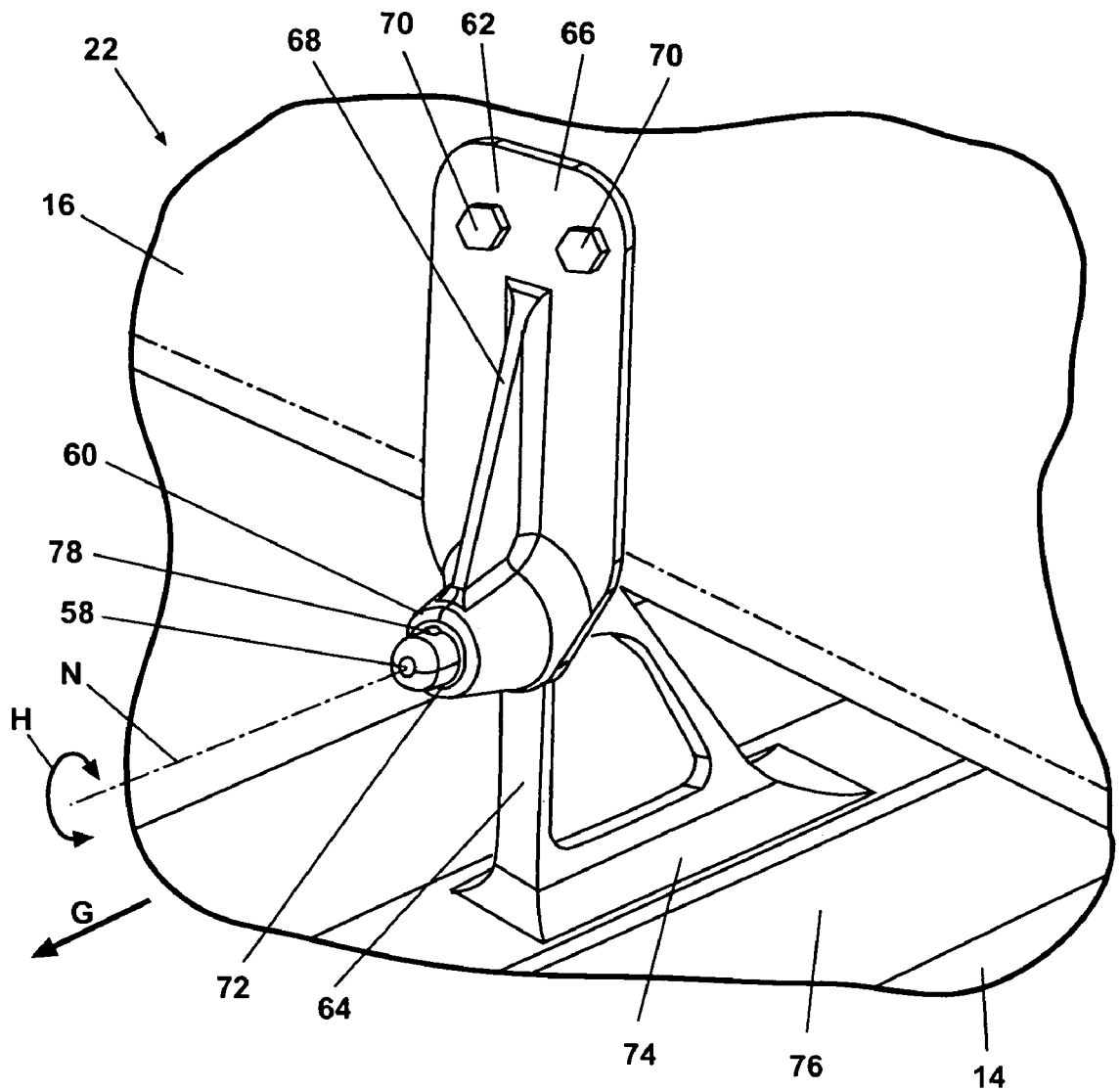
FIG. 7 is a perspective view of a pin assembly of the present invention.

As best seen in FIG. 7, each pin assembly 22 further includes a structural attachment member 62 and a pin member 64. Structural attachment member 62 further includes a base plate 66 having at least one reinforcement flange 68. Base plate 66 is fastened to one of the support structural members 16 using a plurality of fasteners 70. Fasteners 70 are similar to fasteners 36 and will therefore not be further discussed herein. A pin receiving aperture 72 is created within each pin receiving member 60 to slidably receive pin 58.

Pin member 64 further includes a load transfer portion 74 which is used to join pin member 64 to a load distribution member 76. Load distribution member 76 is similar to load distribution member 44 and will therefore not be discussed further herein. Each load distribution member 76 is preconnected to second berth 14. To assist installation of second berth 14, a quick release device 78 is positioned as shown on a distal end of pin 58. An example of quick release device 78 includes a ball bearing having a biasing member to position the ball bearing such that it extends outward from a perimeter of pin 58 such that the ball bearing is displaced by the pin 58 during assembly and the biasing member (not shown) biases the ball bearing outward again after release device 78 extends beyond pin receiving member 60. Quick release devices 78 are generally known in the art and the example provided herein is exemplary of a plurality of devices which can be used. Quick release device 78 is provided as an optional device to assist in the assembly of second berth 14 and does not by itself prevent removal of pin 58 from within pin receiving member 60. Quick release device 78 is available from multiple sources including: an attachment pin, part number 56929-1, from Avibank MFG., Inc., North Hollywood, Calif.; or a ball lock pin available from CarrLane Manufacturing Co., St. Louis, Mo.

Pin 58 is slidably received within pin receiving aperture 72 such that pin 58 can rotate about a longitudinal axis "N" of pin receiving aperture 72. Pin 58 rotates about a rotation arc "H". Rotation of pin 58 is generally limited by the physical constraints of mating surface 57 contacting mating surface 46 and/or second berth 14 contacting one or more support structural members 16. Longitudinal axis "N" in a preferred embodiment of the present invention is positioned substantially parallel to longitudinal axis "L" of the mobile platform. Installation of pin 58 within pin receiving member 60 creates a second berth load bearing position.

Figure 8:
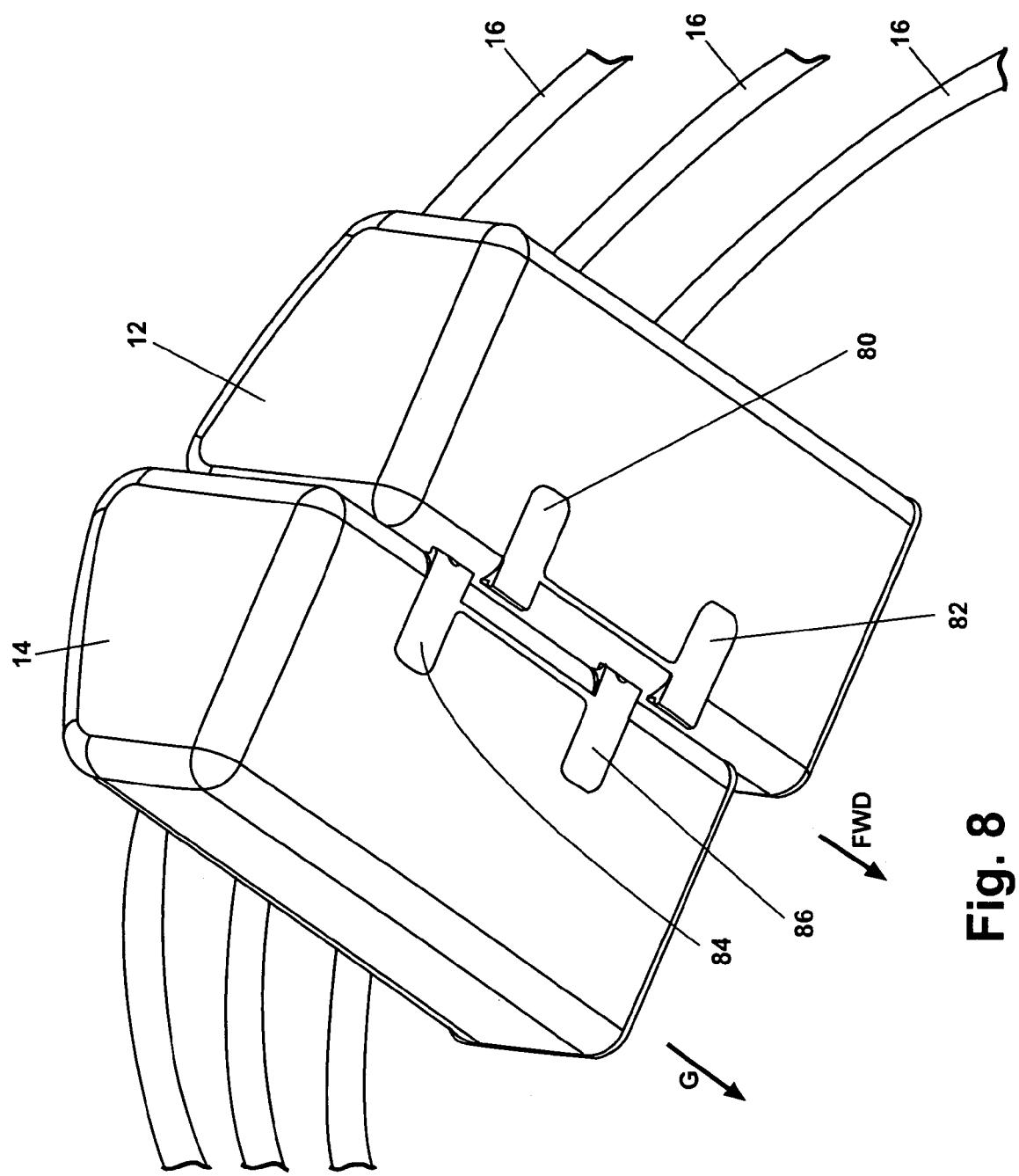
FIG. 8 is a perspective view of an underside of the assembly of FIG. 6.

As best seen in FIG. 8, first berth 12 is provided with a first and a second load distribution pad 80, 82 respectively. Similarly, second berth 14 is provided with a first and a second load distribution pad 84, 86 respectively. Load distribution pads 80, 82, 84, 86 serve a similar function to load distribution members 44 and 76 and are connected to first and second berths 12, 14 in a similar way.

Figure 9:
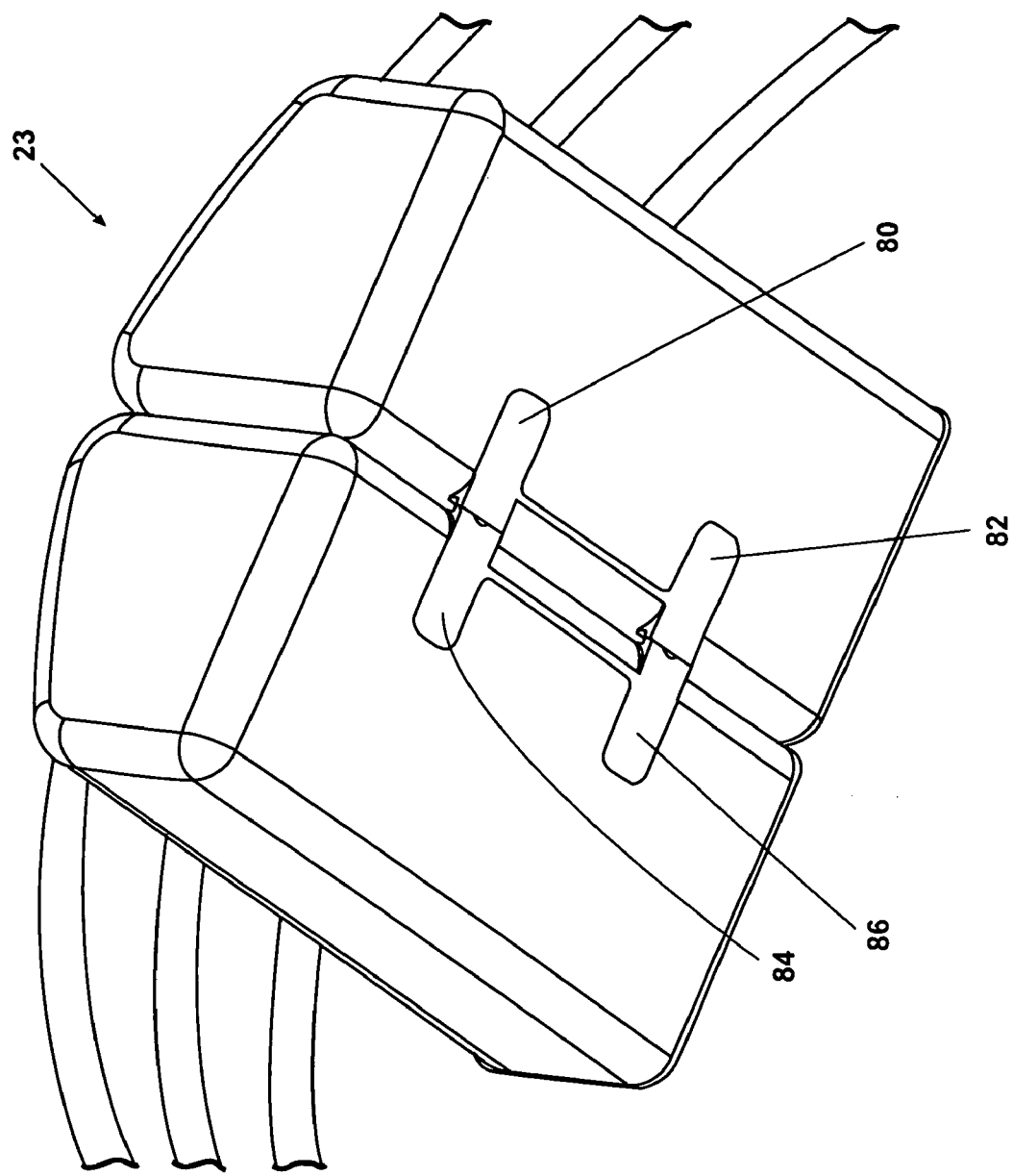
FIG. 9 is a perspective view similar to FIG. 8 showing the installed condition of both first and second berths.

Referring now to FIG. 9, first and second berths 12, 14 are fully installed as shown. In the installed position, load distribution pad 80 aligns with load distribution pad 84 and load distribution pad 82 aligns with load distribution pad 86. In the installed position, mating surface 57 of second berth 14 is aligned substantially parallel with and can abut mating surface 46 of first berth 12.

Figure 10:
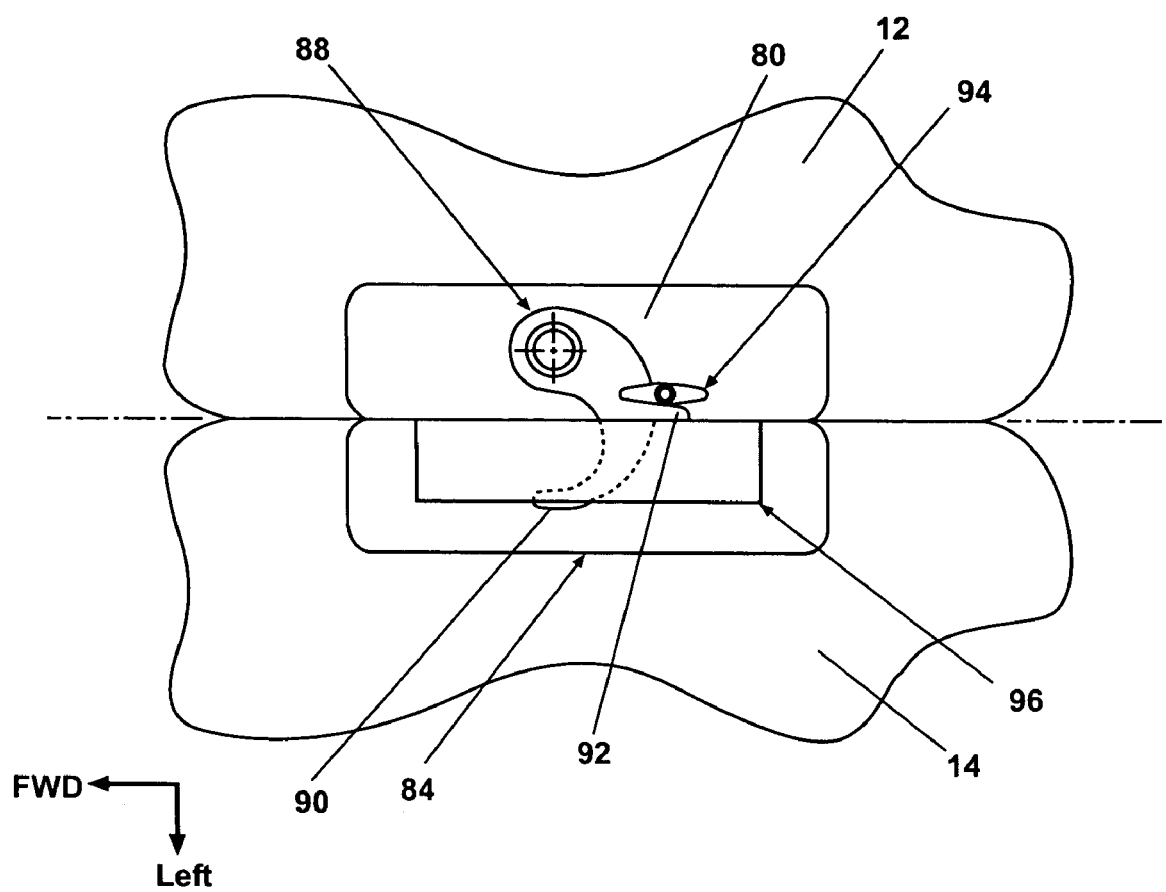
FIG. 10 is a plan view of a cam assembly according to one aspect of the present invention.

Referring now to FIG. 10, an exemplary connection between first load distribution pad 80 and load distribution pad 84 is shown. A cam lock assembly 88 is provided to mechanically join load distribution pads 80 and 84. Cam lock assembly 88 includes a cam 90 which is rotatably coupled to first berth 12. Cam 90 includes a cam retention element 92. A release member 94 engages cam retention element 92 after cam 90 is rotated to engage with a receiver block 96 of second berth 14. Release member 94 thereafter prevents release of cam 90 from receiver block 96. In an engaged position shown, a hooked end of cam 90 engages receiver block 96 to prevent first and second berths 12, 14 from separating from each other. Release member 94 can be thereafter rotated and/or displaced such that cam retention element 92 clears release member 94. Cam 90 can then be rotated back to a release position (not shown) which allows first and second berths 12, 14 to be separated from each other. In a preferred embodiment of the present invention, a cam lock assembly 88 is provided for each hook assembly 20 and/or pin assembly 22, however, the invention is not limited by the quantity of cam lock assemblies 88.

Figure 11:
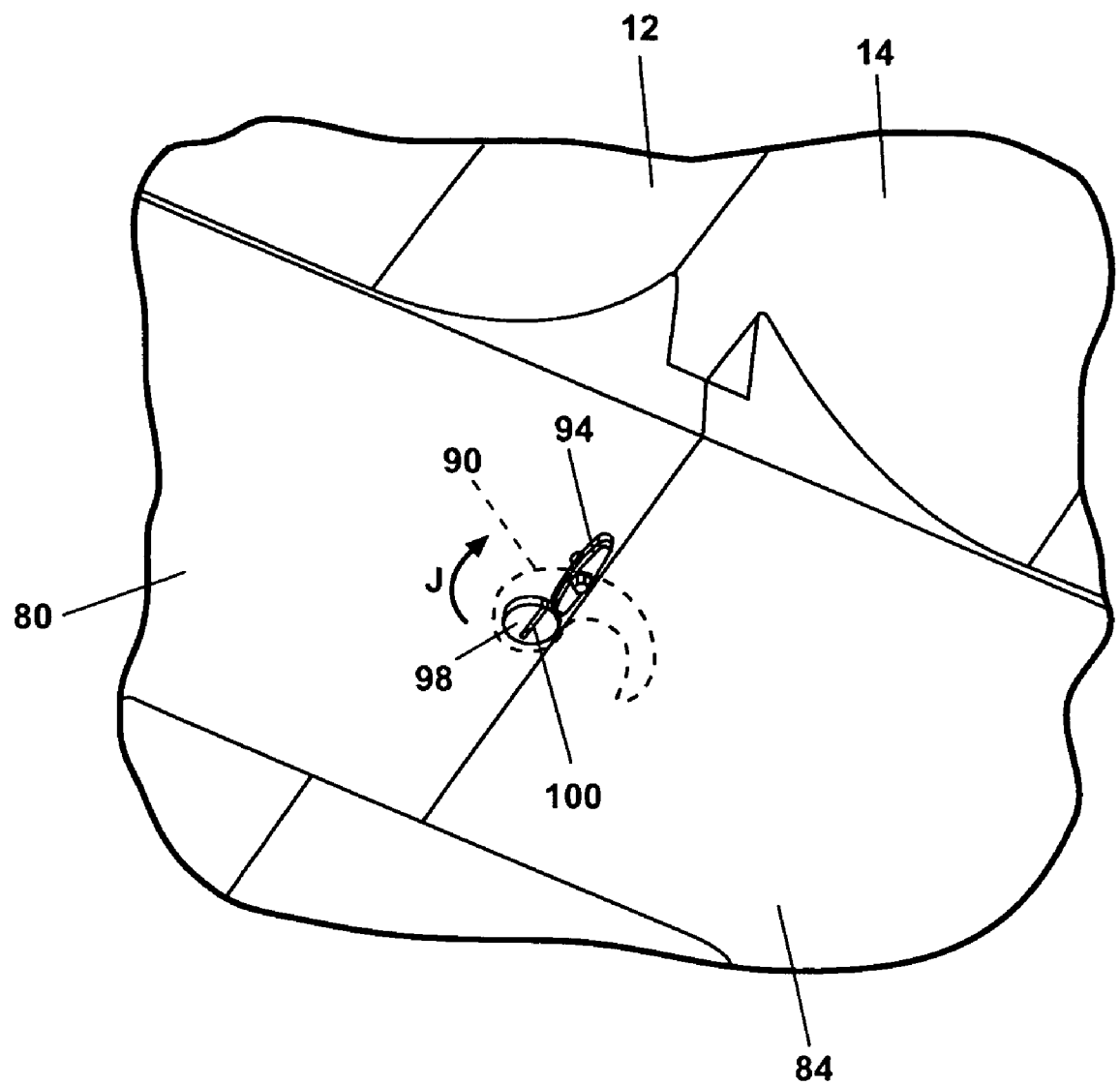
FIG. 11 is a partial perspective view taken beneath the installed assembly shown in FIG. 9 showing the details of the cam assembly.

As best seen in FIG. 11, each cam 90 is further provided with a cam actuator 98. Cam actuator 98 in one embodiment includes a slot 100 by which cam actuator 98 is rotated to thereby rotate cam 90. In the embodiment shown, cam actuator 98 is rotated about a cam rotation arc "J" to engage cam 90 with receiver block 96. Cam actuator 98 can also be provided with alternate rotation devices in addition to slot 100. For example, cam actuator 98 can include a female hexagonal aperture for engagement and rotation by a hexagonal wrench. Cam actuator 98 can also have polygonal external sides allowing use of a wrench or pliers to rotate cam 90. Still further, cam actuator 98 can be provided with knurled external surfaces such that cam actuator 98 can be rotated by hand. The arc shape of cam 90 permits load distribution pad 80 to be drawn into engagement with load distribution pad 84. Connecting first and second berths 12, 14 using one or more cam lock assemblies 88 provides a fast and efficient way of connecting or disassembling the two berths. By physically connecting first and second berths 12, 14 the loads of each berth can be partially transferred from one berth to the other by a path including the cam lock assemblies 88. Connecting first and second berths 12, 14 also fixes berth assembly 23 such that first berth 12 cannot rotate about hook assemblies 20 and second berth 14 cannot rotate about pin assemblies 22.

Figure 12:
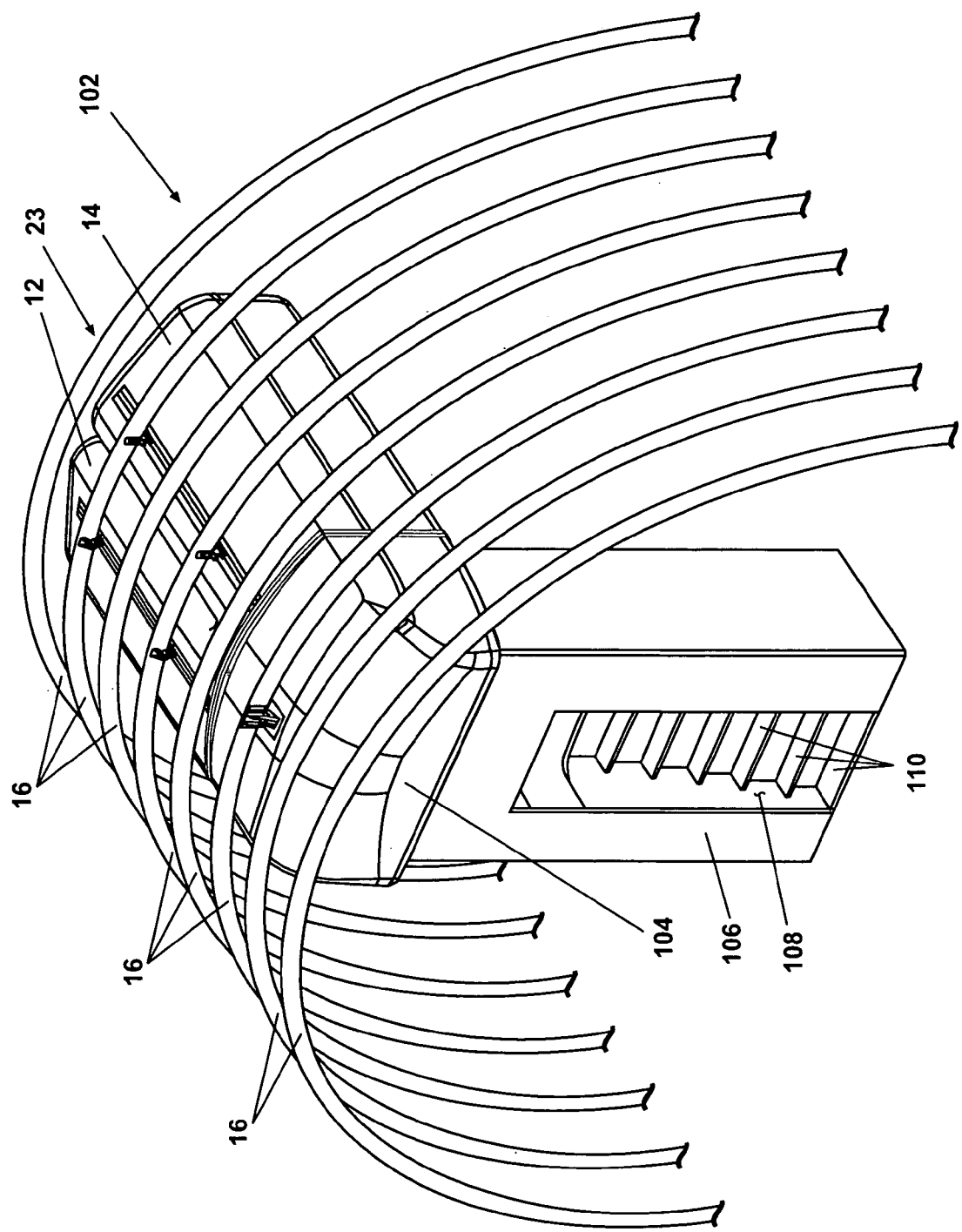
FIG. 12 is a perspective view of a crew rest berth assembly of the present invention having an entrance cap and an entry vestibule connected thereto.

As best seen in FIG. 12, in a further aspect of the present invention, a berth assembly 102 includes first and second berths 12, 14 of berth assembly 23, an entrance cap 104 and an entry vestibule 106. Entrance cap 104 is connected to each of first and second berths 12, 14 to provide common access to each. Entry vestibule 106 includes a cavity 108 having a plurality of steps 110 therein. Steps 110 provide entrance and egress for personnel access of first and second berths 12, 14.

Figure 13:
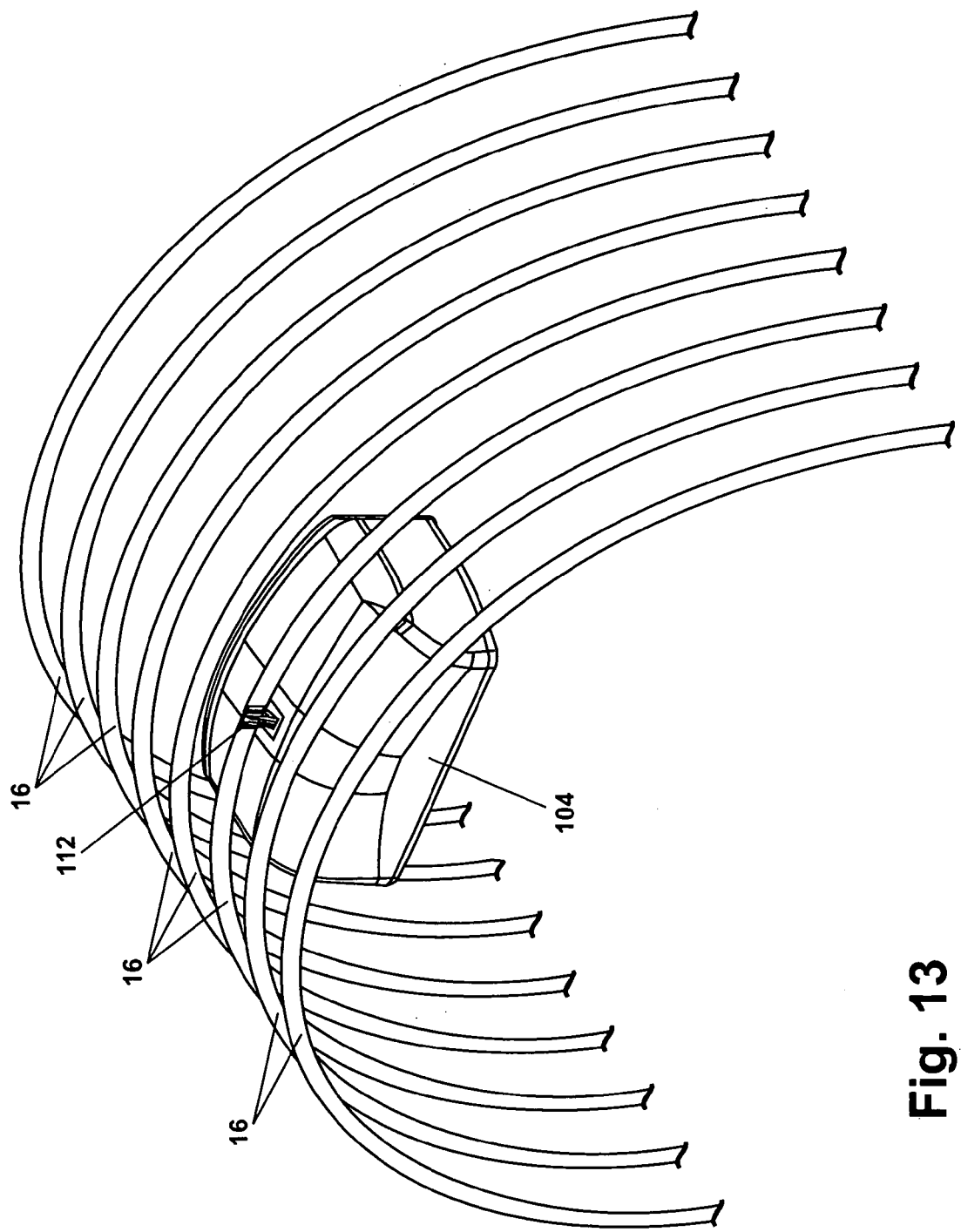
FIG. 13 is a perspective view showing the entrance cap of the present invention.

Referring now to FIG. 13, entrance cap 104 is shown connected to at least one of support structural members 16 using a cap attachment fitting 112. A single cap attachment fitting 112 is shown, multiple cap attachment fittings 112 can be used to support entrance cap 104.

Figure 14:
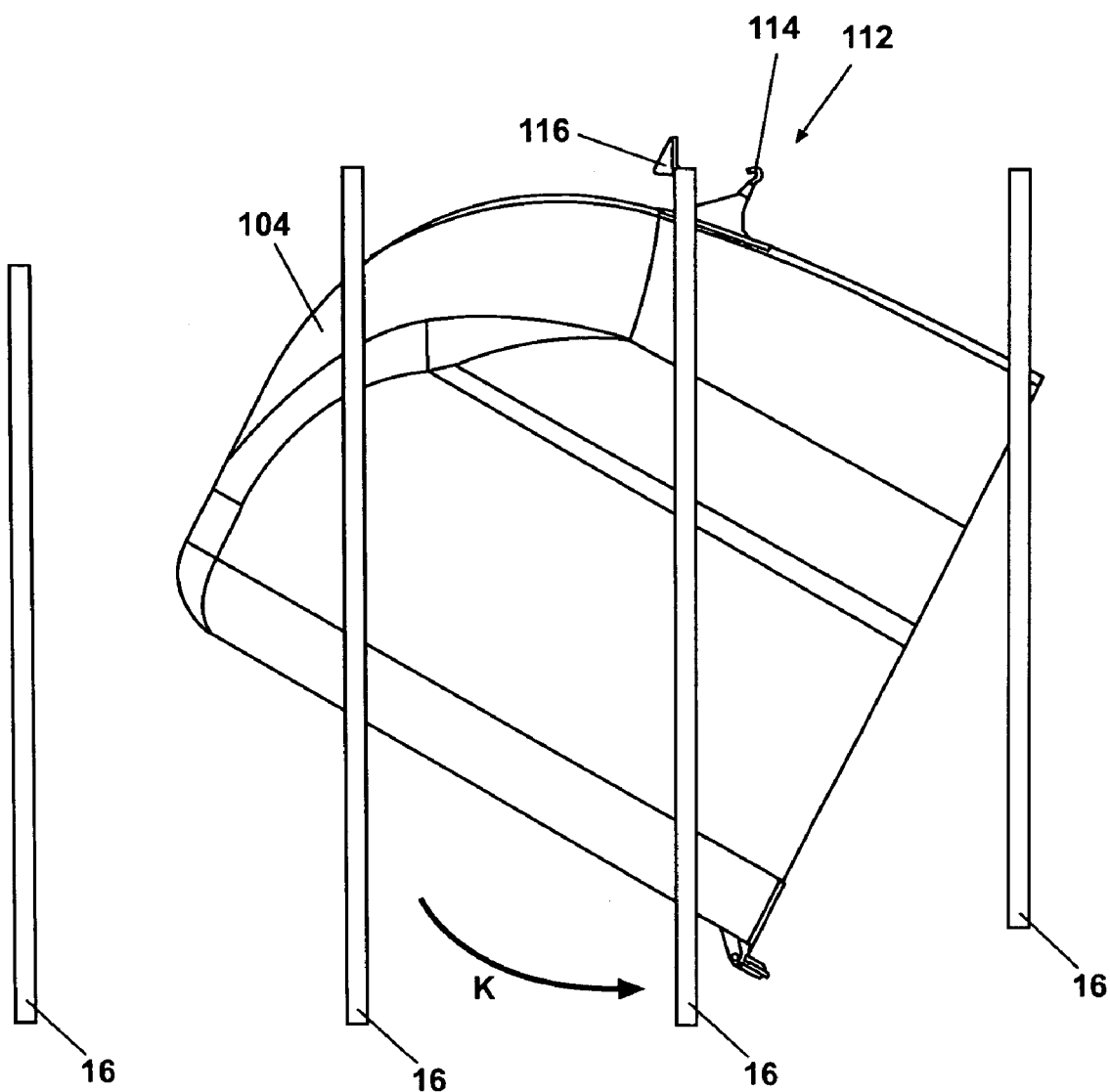
FIG. 14 is a side elevational view of the entrance cap of the present invention identifying a rotation step for connecting a hook assembly to support installation of the entrance cap.

Referring next to FIG. 14, installation of entrance cap 104 includes raising entrance cap 104 to a position generally approximate support structural members 16 as shown. A hook assembly 114 of cap attachment fitting 112 is rotatably connected with a hook receiving member 116, similar to installation of hook 37 with hook receiving slot 34 shown in the embodiment of FIG. 4. Entrance cap 104 is thereafter rotated about an arc "K" to suspend entrance cap 104 from support structural member 16.

Figure 15:
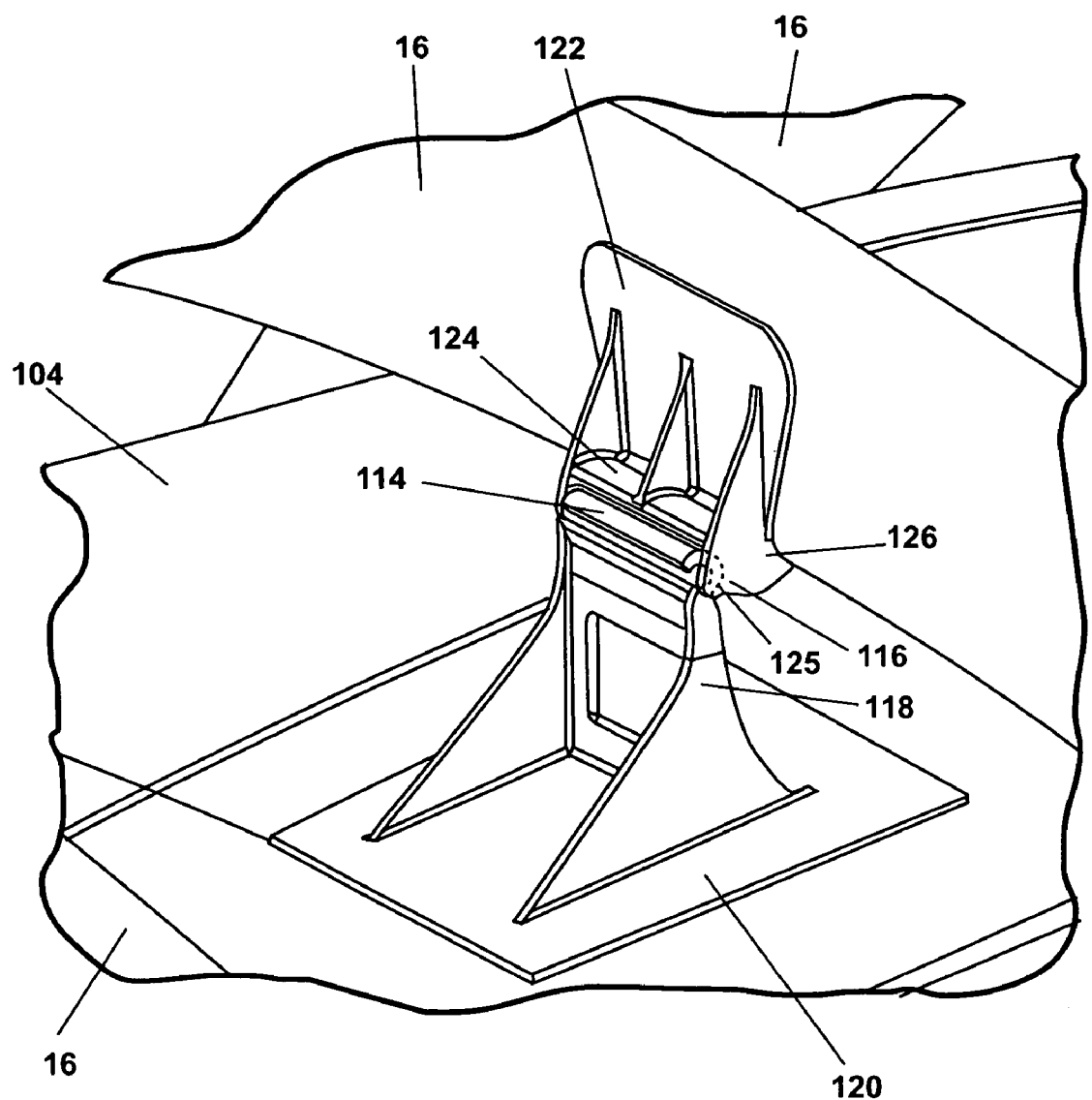
FIG. 15 is a perspective view of a hook assembly adapted for supporting the cap assembly of the present invention.

Referring specifically to FIG. 15, hook assembly 114 further includes a hook support body 118 which is integrally connected to a load distribution member 120. Load distribution member 120 is connected to entrance cap 104. Hook receiving member 116 further includes a load distribution member 122 fastenably connected to at least one of the support structural members 16. A hook bearing member 124 having a hook receiving slot 125 (similar to hook receiving slot 34) is provided with load distribution member 122. Hook bearing member 124 rotatably receives hook assembly 114. One or more flanges 126 are also provided connectably joined to hook receiving member 116 to evenly distribute a load received through hook assembly 114.

Figure 16:
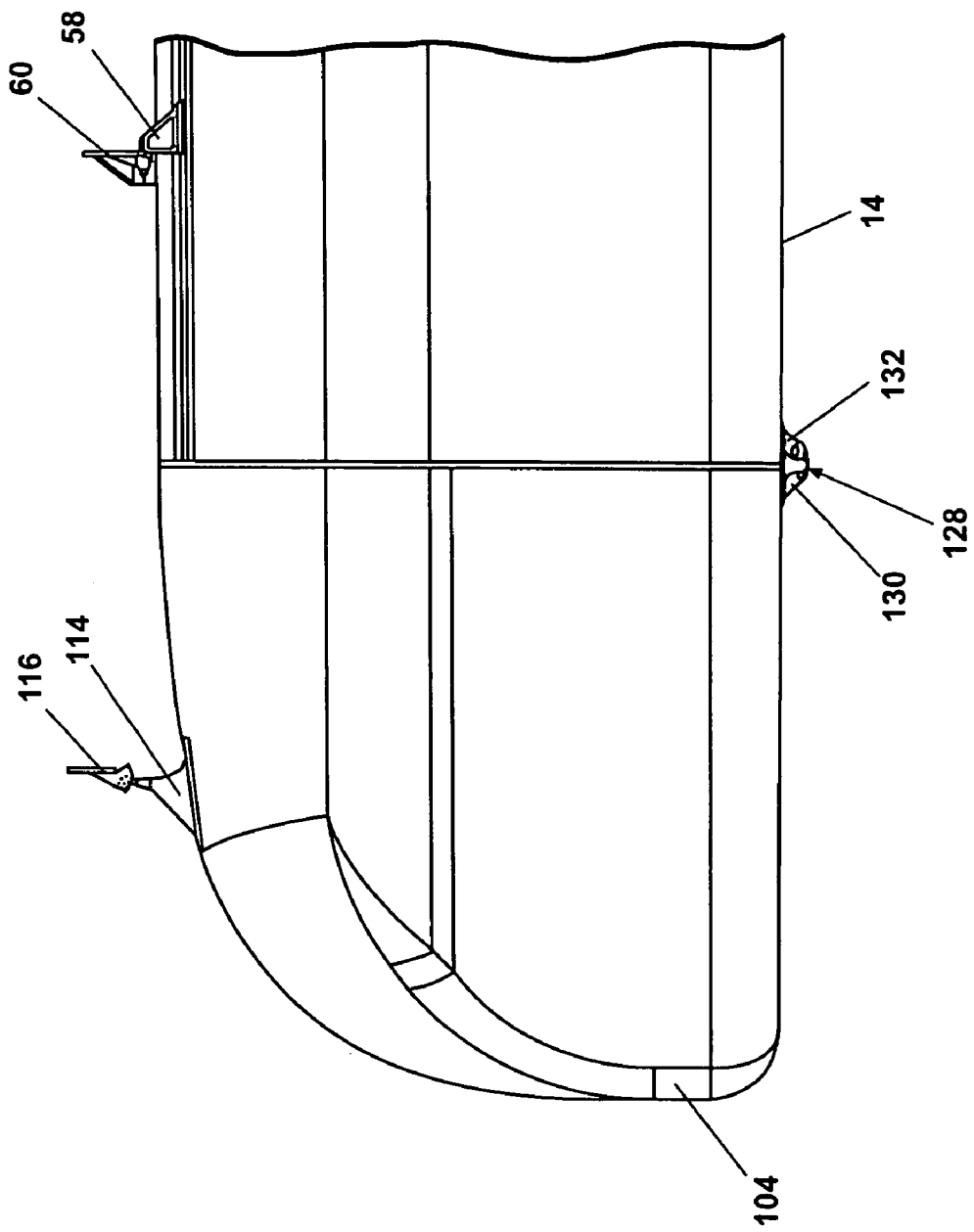
FIG. 16 is a partial side elevational view showing the entrance cap connected to a crew rest berth assembly of the present invention.

As best seen in FIG. 16, entrance cap 104 has been rotated about arc "K" (shown in FIG. 14) until entrance cap 104 reaches the position shown. First and second berths 12, 14 (only second berth 14 is shown in this view) are then suspended/installed as previously described herein and abutting entrance cap 104 as shown. Entrance cap 104 is then connectably joined to each of first and second berths 12, 14 using at least one pin engagement assembly 128. Each pin engagement assembly 128 includes a first pin connector 130 connected to entrance cap 104 and a second pin connector 132 connected to either or both of first and second berths 12, 14. A sub-assembly having entrance cap 104 and first and second berths 12, 14 is thereafter supported by pins 58 connected to pin receiving members 60 (in addition to hook assemblies 20 not shown in this view) and hook assembly 114 connected to hook receiving member 116.

Figure 17:
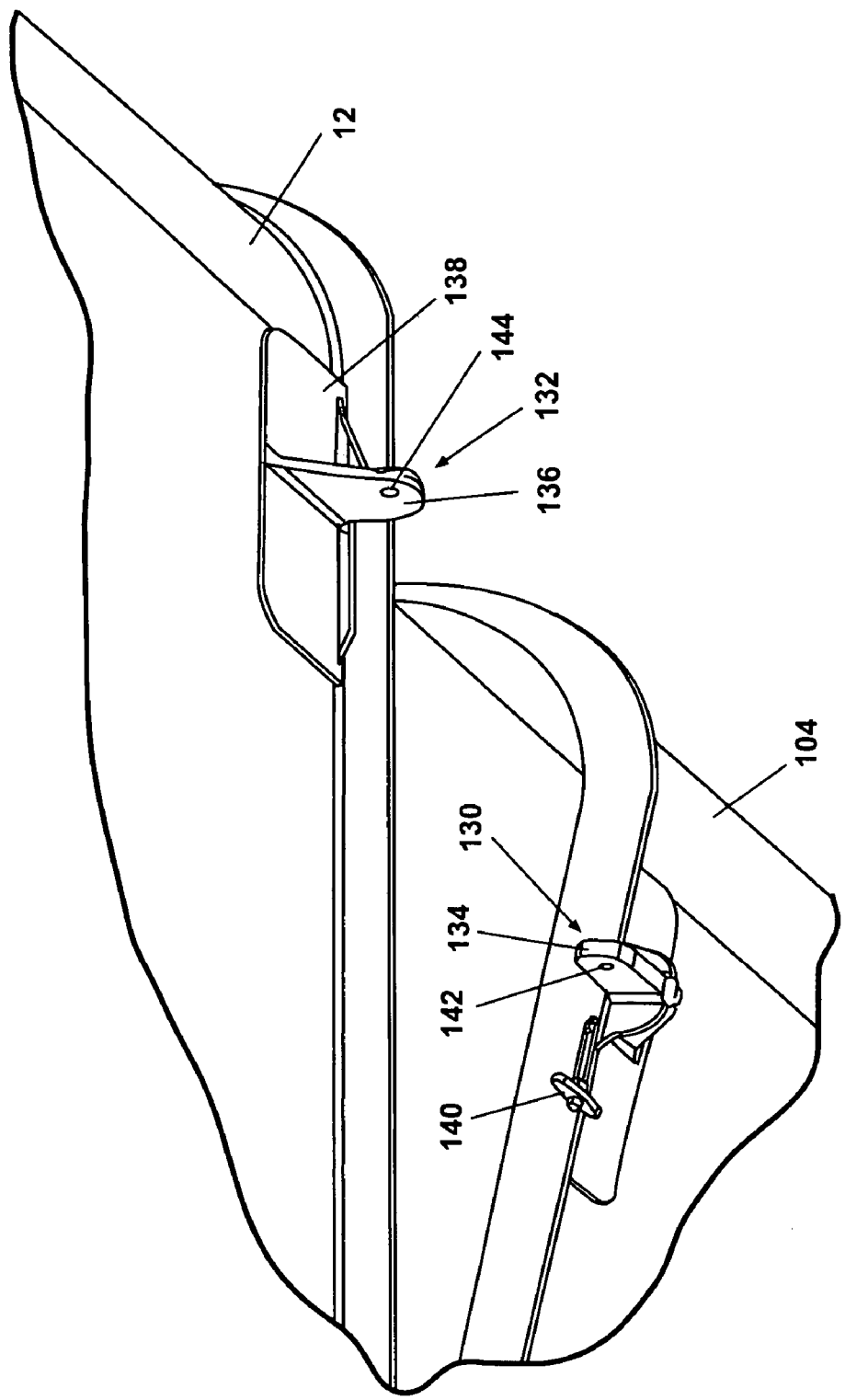
FIG. 17 is a perspective view showing an exemplary connector assembly for joining the cap assembly to the crew rest berth assembly of the present invention.
Figure 18:
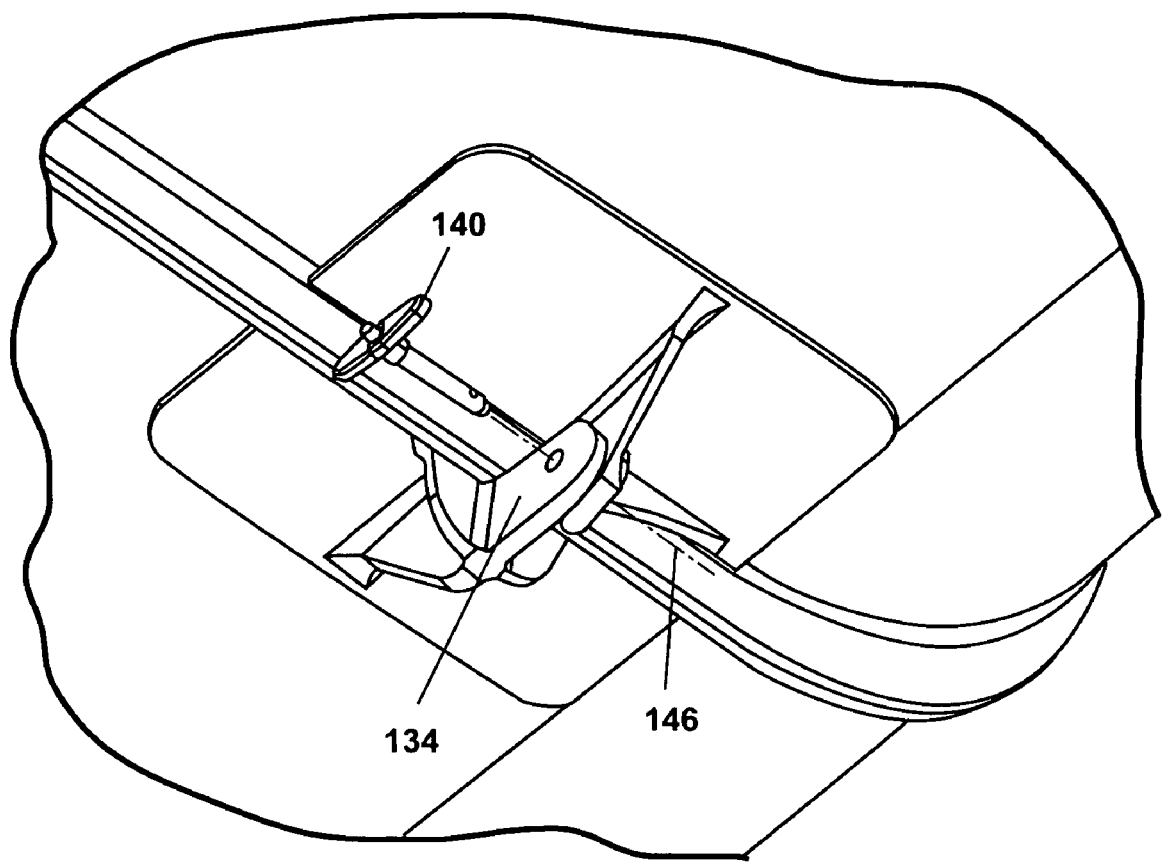
FIG. 18 is a perspective view showing the assembled connection joint prior to installation of a quick release device similar to FIG. 17.

Referring now to FIGS. 17 and 18, the components of pin engagement assembly 128 are shown in greater detail. First pin connector 130 further includes a clevis 134. Second pin connector 132 further includes a mating clevis 136. Mating clevis 136 is supported to either one of first or second berths 12, 14 using a load distribution pad 138. After mating each of first and second pin connectors 130, 132, a quick release device 140 is inserted into each of an aperture 142 created in clevis 134 and a subsequent aperture 144 created in mating clevis 136. Quick release device 140 is similar to quick release device 78 and will therefore not be described in further detail herein. Quick release device 140 is inserted into each of apertures 142, 144 when apertures 142, 144 each align on a common axis 146. Quick release device 140 can also be replaced by a more permanent fastener connection such as a bolt and nut assembly or a stud bolt.

Figure 19:
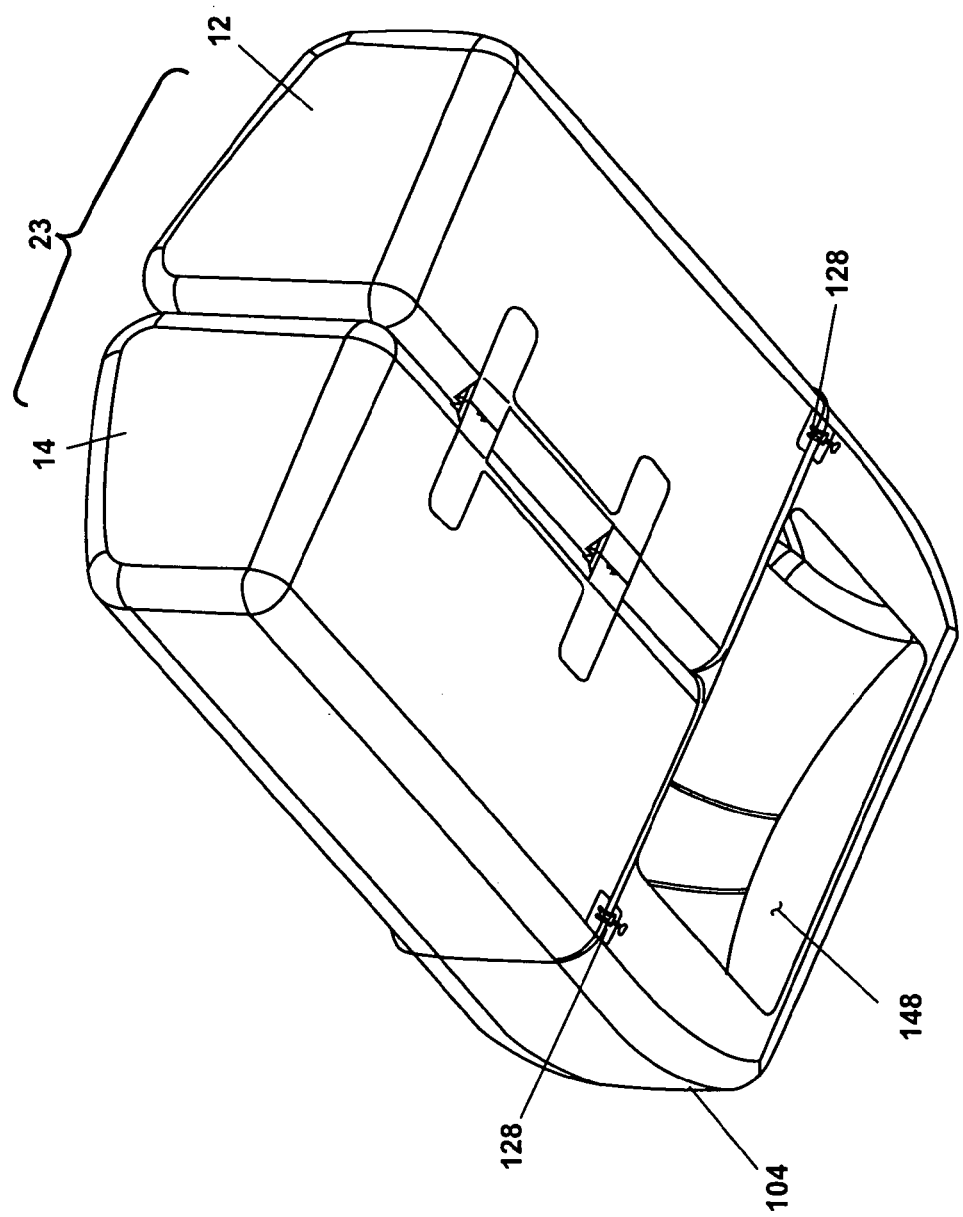
FIG. 19 is a bottom perspective view showing a completed installation of the cap assembly to the crew rest berth assembly of the present invention.
Figure 20:
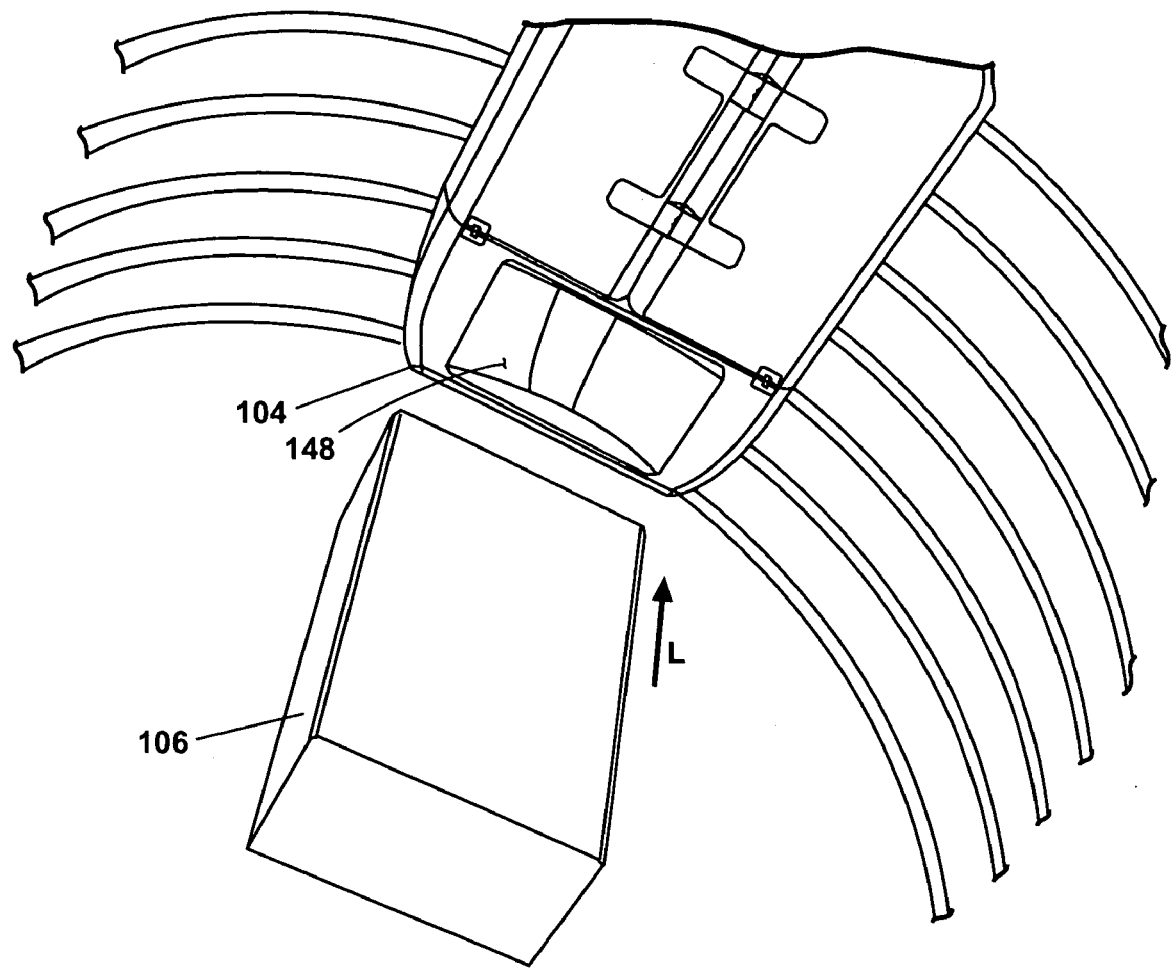
FIG. 20 is a bottom perspective view identifying an installation path for installing an entry vestibule adjacent the cap assembly of the present invention.
Figure 21:
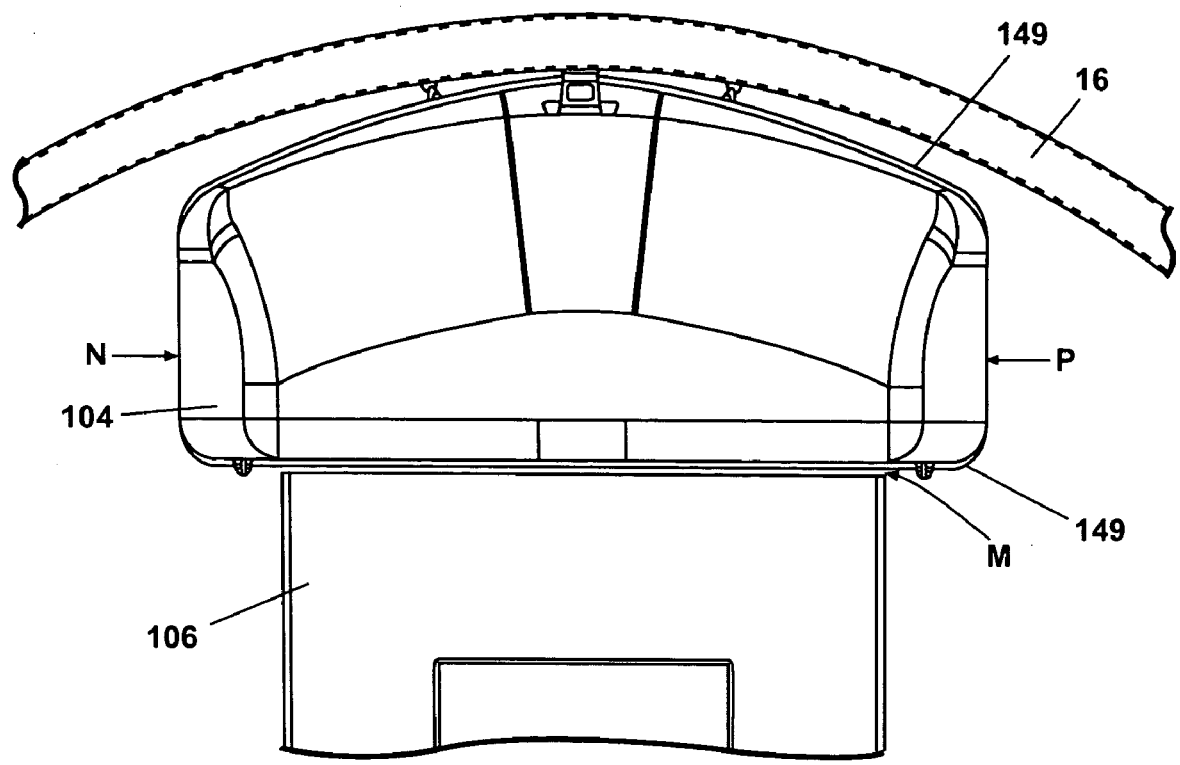
FIG. 21 is a end elevational view showing an installed entry vestibule positioned with clearance to a cap assembly of the present invention.

Referring generally to FIGS. 19 through 21, the sub-assembly of berth assembly 23 including first and second berths 12, 14 joined to entrance cap 104 using an exemplary pair of pin engagement assemblies 128 links a personnel access cavity 148 created in entrance cap 104 to each of first and second berths 12, 14. Entry vestibule 106 is then positioned in the general direction of arrow "L" such that cavity 108 of entry vestibule 106 generally aligns with personnel access cavity 148 of entrance cap 104. Entry vestibule 106 is positioned adjacent to, but not in contact with entrance cap 104. A nominal clearance "M" is retained between entry vestibule 106 and entrance cap 104 of approximately 2.54 cm (1 inch) to provide for aircraft expansion and pressurization. Nominal clearance "M" is covered by trim pieces or flexible seals (not shown) connected to either entrance cap 104 or entry vestibule 106. Entry vestibule 106 is therefore free standing in relation to entrance cap 104 and does not form a connected part of the berth assembly. Connections for supporting entry vestibule 106 are provided to structure of the aircraft floor and/or seat tracks (not shown).

Dynamic and static load paths are operably formed between the first and second berths of the present invention using cam lock assemblies 88. Dynamic and static load paths are operably formed between the first and second berths of the present invention and support structural members 16 via hook assemblies 20 and pin assemblies 22. These load paths are also shared with entrance cap 104 via pin engagement assemblies 128 and cap attachment fittings 112. Load distribution members 44, 76, 120, and 122, load distribution pads 80, 82, 84 and 86, and load bearing member 53 are provided to distribute static and dynamic loads of the first and second berths 12, 14 and the entrance cap 104 and therefore form portions of the various load paths.

Referring more specifically to FIG. 21, a stiffening flange 149 is provided with entrance cap 104 where entrance cap 104 and both first and second berths 12, 14 are joined. The portions of stiffening flange 149 that extend beyond opposed sides "N" and "P" of entrance cap 104 are removed, for example by machining. Nominal clearance "M" is more clearly visible in FIG. 21.

Figure 22:
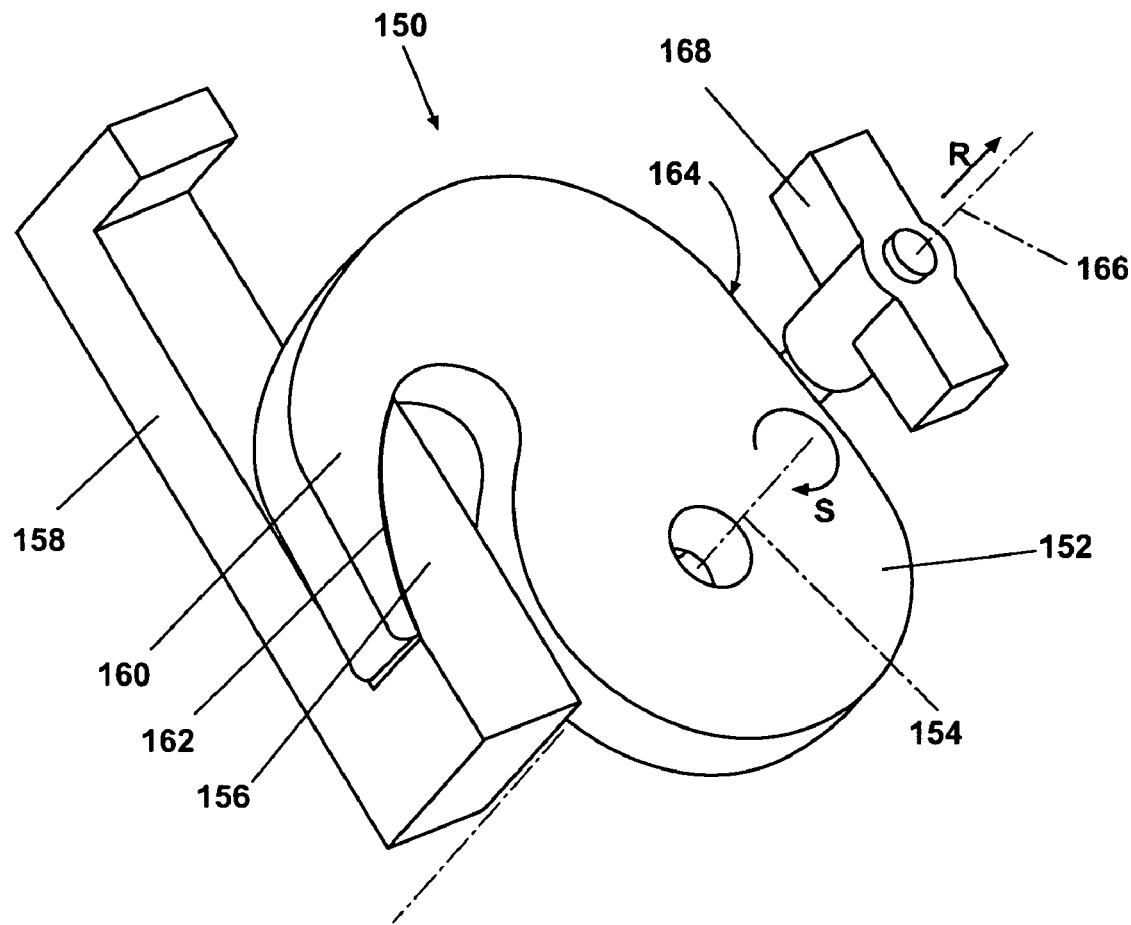
FIG. 22 is a perspective view of another embodiment of a cam/lock assembly of the present invention.

Referring to FIG. 22, an additional embodiment of a cam lock assembly 150 modified from cam lock assembly 88 includes a cam 152 rotatably positionable about a cam axis of rotation 154, and connectable for example to first berth 12. In the engaged position shown, a hook-shaped element 160 of cam 152 engages a portion 156 of an engagement element 158 connected to second berth 14 along a curved engagement face 162. Cam 152 is held in the engaged position shown by contact at a cam stop face 164 by a release member 168. Release member 168 is longitudinally positionable along an axis 166. Release member 168 is preferably provided as a quick release device similar to quick release device 140. Release member 168 is longitudinally retracted from the position shown along axis 154 in the direction of arrow "R" until clear of cam stop face 164. This permits cam 152 to be rotated about cam axis of rotation 154 in the direction of arc "S" to release hook-shaped element 160 from portion 156.

Figure 23:
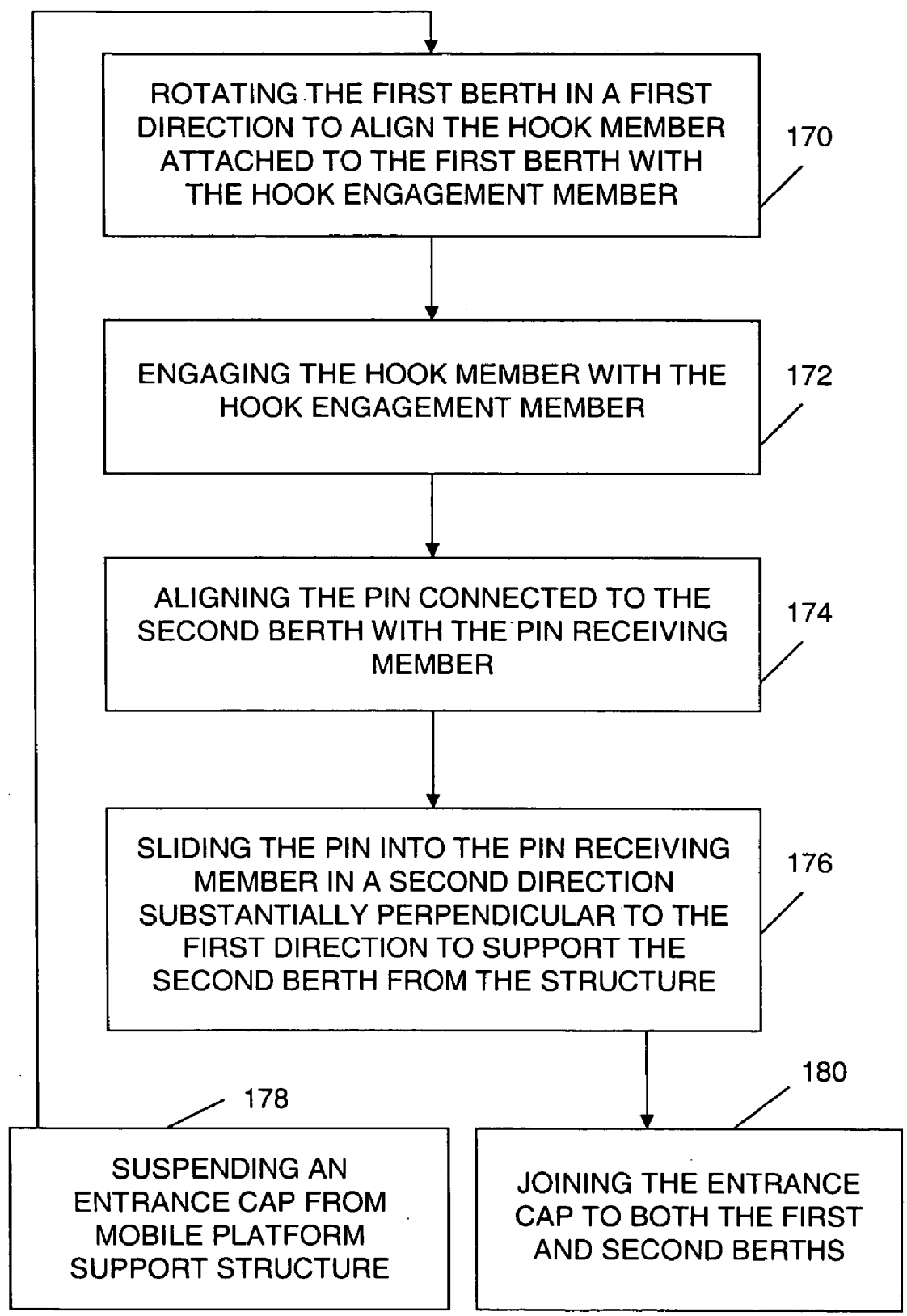
FIG. 23 is a flow diagram of exemplary operations to install a berth assembly according to one aspect of the present invention.

Referring generally now to FIG. 23, various operations to install a berth assembly 23 are described. An operation 170 includes rotating the first berth in a first direction to align the hook member attached to the first berth with the hook engagement member. An operation 172 includes engaging the hook member with the hook engagement member. An operation 174 includes aligning the pin connected to the second berth with the pin receiving member. An operation 176 includes sliding the pin into the pin receiving member in a second direction substantially perpendicular to the first direction to support the second berth from the structure. A parallel operation 178 includes suspending an entrance cap from mobile platform support structure prior to operation 170. Still another parallel operation 180 includes joining the entrance cap to both the first and second berths.

An overhead rest assembly of the present invention offers several advantages. By connecting a first berth to structure of a mobile platform using a hook assembly, the first berth is allowed to rotate in a first direction. By connecting a second berth to the structure of the mobile platform using a pin assembly, the second berth is allowed to rotate in a second direction which is substantially perpendicular to the first direction. Allowing limited rotation of each berth during installation permits the berths to be landed without interfering with each other while permitting the first berth to be used as an additional alignment device to help align the second berth when it is landed. Hook assemblies of the present invention allow the first berth to be rotated for either installation or removal but otherwise retained in a normal load bearing condition. A cam assembly of the present invention allows two berths to be connected to form a berth assembly. The combination of cam assemblies, hook assemblies, and pin assemblies of the present invention prevents subsequent motion of the berths and allows loads from either one of the berths to be partially transferred through the other berth.

While various preferred embodiments have been described, those skilled in the art will recognize modifications or variations which might be made without departing from the inventive concept. The examples illustrate the invention and are not intended to limit it. For example, a displacement or slide feature can be included to allow for deflection between the mobile platform support structure and the crew rest berths of the present invention. Therefore, the description and claims should be interpreted liberally with only such limitation as is necessary in view of the pertinent prior art.

What is claimed is:

1. A mobile platform crew rest berth support system, comprising:
    a crew berth assembly including at least a first berth connectable to a second berth;
    at least one hook assembly connectable between the first berth and a structure of the mobile platform and operable to suspend the first berth from the structure;
    at least one pin assembly connectable between the second berth and the structure of the mobile platform and operable to suspend the second berth from the structure;
    wherein the hook assembly permits rotation of the first berth along a first rotation arc and the pin assembly permits rotation of the second berth along a second rotation arc substantially oppositely directed to the first arc such that when the first berth is connected to the second berth the berth assembly is restrained from motion in either of the first or the second arcs of rotation.

2. The support system of claim 1, wherein each of the first and the second berths comprise a carbon fiber material defining a personal enclosure for an occupant of the mobile platform.

3. The support system of claim 1, wherein each said hook assembly further comprises:
    a base member fastenable to the structure of the mobile platform, the base member including a hook receiving slot; and a hook member connectable to the first berth, the hook member including a distally extending hook rotatably engageable within the receiving slot of the base member, the hook defining a hook cavity.

4. The support system of claim 3, wherein each said base member further comprises a load bearing member engageable within the hook cavity and operable to support the first berth in a first berth load bearing position.

5. The support system of claim 4, wherein each said base member further comprises a hook retention member operable to retain the hook within the receiving slot when the hook is in the load bearing position, and operable to permit removal of the hook only by rotation of the first berth along the first rotation arc away from the load bearing position.

6. The support system of claim 4, wherein the hook member is positionable with respect to a center of gravity of the first berth such that a mating surface of the first berth is substantially parallel to a vertical plane in the load bearing position.

7. The support system of claim 4, further comprising at least one load distribution member connectable to the first berth and operable to distribute a load of the second berth from the hook through the load bearing member to the first berth.

8. The support system of claim 1, wherein each said pin assembly further comprises:
 a base plate fastenable to the structure of the mobile platform, the base plate including a pin receiving member having a pin receiving aperture; and
 a pin member connectable to the second berth, the pin member including a distally extending pin slidably engageable within the pin receiving aperture of the pin receiving member such that the second berth is rotatable about the pin along the second rotation arc.

9. The support system of claim 8, wherein the pin member further comprises a biased release device operable to retain the pin within the pin receiving aperture in a second berth load bearing position.

10. The support system of claim 8, further comprising a load distribution member connectable to the second berth and operable to distribute a load of the second berth from the pin through the pin receiving member to the second berth.

11. A mobile platform crew rest berth support system, comprising:
 a crew berth assembly including at least a first berth and a second berth;
 at least one hook assembly connectable between the first berth and a structure of the mobile platform operable to suspend the first berth from the structure;
 at least one pin assembly connectable between the second berth and the structure of the mobile platform operable to suspend the second berth from the structure; and
 at least one cam assembly operable to releasably connect the first berth to the second berth;
 wherein the hook assembly permits rotation of the first berth in a first path and the pin assembly permits rotation of the second berth in a second path substantially oppositely directed from the first path such that when the first berth is connected to the second berth using the cam assembly the crew berth assembly is restrained from motion in either the first or the second paths.

12. The support system of claim 11, wherein the at least one hook assembly further comprises at least a first and a second hook assembly each aligned substantially in parallel with a longitudinal axis of the mobile platform.

13. The support system of claim 11, wherein the at least one pin assembly further comprises at least a first and a second pin assembly each aligned substantially in parallel with a longitudinal axis of the mobile platform.

14. The support system of claim 11, wherein each said hook assembly further comprises:
 a base member fastenable to the structure of the mobile platform, the base member including a hook receiving slot;
 wherein a longitudinal axis of the hook receiving slot is aligned substantially in parallel with a longitudinal axis of the mobile platform.

15. The support system of claim 14, wherein each said hook assembly further comprises a hook member connectable to the first berth, the hook member including a distally extending hook rotatively engageable within the hook receiving slot of the base member.

16. The support system of claim 11, wherein each said pin assembly further comprises:
 a base plate fastenable to the structure of the mobile platform, the base plate including a pin receiving member having a pin receiving aperture;
 wherein a longitudinal axis of the pin receiving aperture is aligned substantially in parallel with a longitudinal axis of the mobile platform.

17. The support system of claim 16, further comprising a pin member connectable to the second berth, the pin member including a distally extending pin slidably engageable within the pin receiving aperture of the pin receiving member.

18. The support system of claim 11, wherein each said cam assembly comprises:
 a cam adaptable for rotation, the cam connectable to a first selected one of the first and second berths;
 a cam actuator operable to rotate the cam between each of a cam disengaged and a cam engaged position; and
 a cam receiving block connectable to a second selected one of the first and second berths and positionable to receive the cam in the cam engaged position.

19. The support system of claim 18, further comprising a release member operable to releasably retain the cam in the cam engaged position.

20. The support system of claim 11, further comprising a plurality of crew berth load distribution paths, including:
 a first load path of the first berth partially distributable through the second berth via both the cam assembly and the pin assembly; and
 a second load path of the second berth partially distributable through the first berth via both the cam assembly and the hook assembly.

21. The support system of claim 11, further comprising an entrance cap having an access cavity in common communication with both the first berth and the second berth.

22. The support system of claim 21, further comprising an access housing aligned with and spatially separated from the entrance cap.

23. The support system of claim 21, further comprising at least one connector operable to mechanically join the entrance cap to each of the first berth and the second berth, and further operable to provide a shared load path between the entrance cap and at least one of the first and second berths.

24. The support system of claim 21, further comprising a cap attachment fitting including a second hook assembly and a hook receiving member, operable to rotatably connect the entrance cap to the structure of the mobile platform.

* * * * *